(12) United States Patent
Chang et al.

(10) Patent No.: US 10,614,780 B2
(45) Date of Patent: Apr. 7, 2020

(54) METHOD OF DISPLAYING INFORMATION AND DISPLAYING SYSTEM THEREOF

(71) Applicants: Industrial Technology Research Institute, Hsinchu (TW); Intellectual Property Innovation Corporation, Hsinchu (TW)

(72) Inventors: Chih-Chia Chang, Hsinchu County (TW); Yu-Hsin Lin, Miaoli County (TW); Jian-Lung Chen, Taoyuan (TW); Pi-Hsien Wang, Hsinchu (TW); Shin-Hong Kuo, New Taipei (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 55 days.

(21) Appl. No.: 16/122,894

(22) Filed: Sep. 6, 2018

(65) Prior Publication Data

US 2019/0385573 A1    Dec. 19, 2019

(30) Foreign Application Priority Data

Jun. 15, 2018  (TW) .............................. 107120865 A

(51) Int. Cl.
*G09G 5/38* (2006.01)
*G06T 7/73* (2017.01)
(Continued)

(52) U.S. Cl.
CPC ............... *G09G 5/38* (2013.01); *B60K 35/00* (2013.01); *G02B 27/0101* (2013.01);
(Continued)

(58) Field of Classification Search
CPC .. G09G 5/38; G06T 7/74; G06T 7/248; G06T 2207/30201; G06T 2207/30241;
(Continued)

(56) References Cited

U.S. PATENT DOCUMENTS 8,466,894 B2    6/2013  Sugita et al.
2009/0125226 A1  5/2009  Laumeyer et al.
(Continued)

FOREIGN PATENT DOCUMENTS

CN    104052923    9/2014
CN    106303217    1/2017
(Continued)

OTHER PUBLICATIONS

Dogan, Real Time Speed Estimation of Moving Vehicles from Side View Images from an Uncalibrated Video Camera, Sensors 2010, 10, 4805-4824; doi:10.3390/s100504805 (Year: 2010).*
(Continued)

*Primary Examiner* — Phuc N Doan
(74) *Attorney, Agent, or Firm* — JCIPRNET

(57) ABSTRACT

The present disclosure provides a method and system of displaying information, applied to a transparent display configured on a vehicle. The method includes: capturing an image including a target at a first time point; identifying the target in the image, so as to acquire a first relative position of the target; acquiring first identification information of the target; acquiring relative moving information between the vehicle and the target; estimating a first estimated position and first estimated time of the target that appears in a display region of the transparent display according to the first relative position of the target, the first time point and the relative moving information; and displaying prompting information corresponding to the target on the transparent display according to the first estimated time, the first esti-
(Continued)

mated position of the target and the first identification information of the target.

16 Claims, 21 Drawing Sheets

(51) Int. Cl.
*G06T 7/246* (2017.01)
*G06K 9/00* (2006.01)
*G02B 27/01* (2006.01)
*B60K 35/00* (2006.01)
*B61K 13/04* (2006.01)

(52) U.S. Cl.
CPC ..... *G06K 9/00791* (2013.01); *G06K 9/00832* (2013.01); *G06T 7/248* (2017.01); *G06T 7/74* (2017.01); *B61K 13/04* (2013.01); *G02B 27/0179* (2013.01); *G02B 2027/014* (2013.01); *G02B 2027/0138* (2013.01); *G02B 2027/0141* (2013.01); *G02B 2027/0187* (2013.01); *G06T 2207/30201* (2013.01); *G06T 2207/30241* (2013.01); *G06T 2207/30252* (2013.01); *G06T 2207/30268* (2013.01)

(58) Field of Classification Search
CPC ........... G06T 2207/30252; G06T 2207/30268; B60K 35/00; G02B 27/0101; G02B 27/0179; G02B 2027/0138; G02B 2027/014; G02B 2027/0141; G02B 2027/0187; G06K 9/00791; G06K 9/00832; B61K 13/04
See application file for complete search history.

(56) References Cited

U.S. PATENT DOCUMENTS

| | | |
|---|---|---|
| 2010/0324775 A1 | 12/2010 | Kermani et al. |
| 2012/0026108 A1 | 2/2012 | Sugita et al. |
| 2012/0072873 A1 | 3/2012 | Park et al. |
| 2013/0187952 A1 | 6/2013 | Berkovich et al. |
| 2013/0265232 A1 | 10/2013 | Yun et al. |
| 2015/0091740 A1* | 4/2015 | Bai ................... G08B 21/06 340/901 |
| 2015/0302606 A1* | 10/2015 | Stein .................. G08G 1/16 382/103 |
| 2015/0334269 A1* | 11/2015 | Yokota ................ H04N 5/232 382/103 |
| 2017/0223261 A1 | 8/2017 | Shimizu et al. |
| 2017/0292315 A1* | 10/2017 | Koravadi .............. B60Q 9/008 |
| 2018/0151075 A1* | 5/2018 | Claesson ............. H04W 4/029 |

FOREIGN PATENT DOCUMENTS

| | | |
|---|---|---|
| CN | 106575027 | 4/2017 |
| CN | 106686230 | 5/2017 |
| TW | 201350912 | 12/2013 |
| TW | 201543333 | 11/2015 |
| TW | 201606352 | 2/2016 |

OTHER PUBLICATIONS

Douxchamps, High accuracy traffic monitoring using road-side line-scan cameras, 2006 IEEE Intelligent Transportation Systems Conference, pp. 875-878 (Year: 2006).*

* cited by examiner

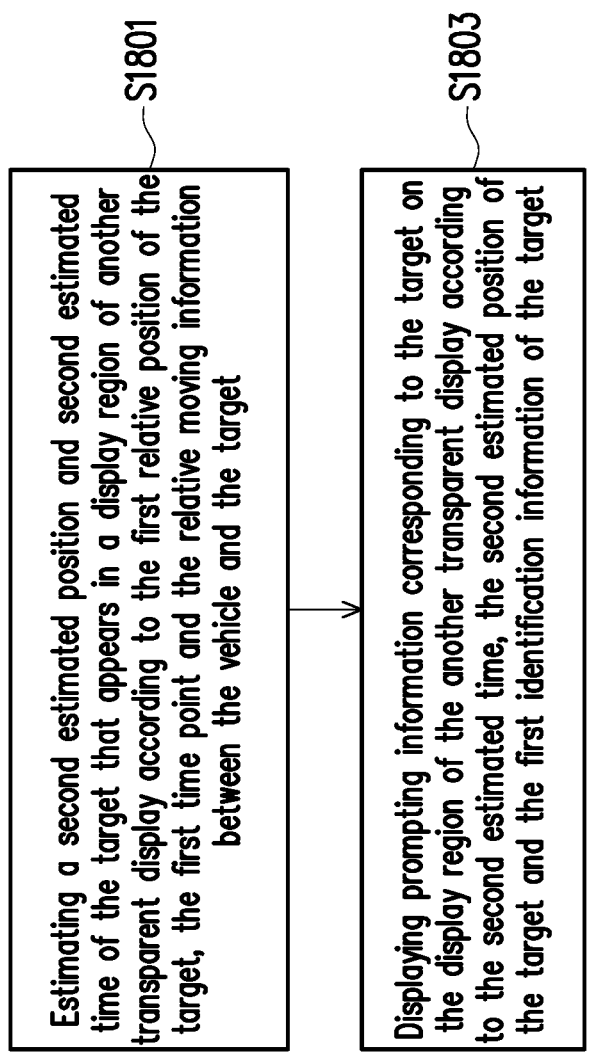

METHOD OF DISPLAYING INFORMATION AND DISPLAYING SYSTEM THEREOF

CROSS-REFERENCE TO RELATED APPLICATION

This application claims the priority benefit of a Taiwan application serial no. 107120865, filed on Jun. 15, 2018. The entirety of the above-mentioned patent application is hereby incorporated by reference herein.

TECHNICAL FIELD

The present disclosure relates to a method of displaying information and a displaying system, in particular to a method and system of displaying information for a transparent display.

BACKGROUND

The information and communication industry has become a current mainstream industry. Various portable communication displaying products are the focus of development at the present. As a flat-panel display is a communication interface between human and information, it is important to develop the flat-panel display. In addition, a technology of a transparent display panel is also developed actively now. The transparent display panel is a display panel body that has a penetrability to a certain extent, and may display a background behind the display panel. A transparent display is applicable to various occasions such as a building window, an automobile window and a shop window.

The transparent display and an Augmented Reality (AR) technology are combined, so that a virtual object and a real object behind the transparent display may be overlapped. The transparent display is also often used for realizing the above-mentioned guidance and explication applications. For example, the transparent display configured on a vehicle may simultaneously display scenery outside a window and relevant information (for example, explicatory information or other advertisement information) corresponding to the scenery. That is to say, when the scenery seen through the transparent display and the relevant information that is displayed by the transparent display and corresponds to the scenery fall within a range within which a viewer may simultaneously view the two, a relative position between the outside scenery in a visual line of the viewer and the relevant information thereof may be kept fixed. At the present, most of external image circuits are mounted within the visual range of a user. After the target enters the transparent display, the target needs to be identified by the external image circuit at first and then relevant information of the target is displayed on a display region of the transparent display, easily resulting in that the information display time of the transparent display is extremely short and may not meet requirements of a user.

One embodiment of the present disclosure provides a method of displaying information, applied to a transparent display configured on a vehicle. The method includes: capturing an image including a target at a first time point; identifying the target in the image to acquire a first relative position of the target; acquiring first identification information of the target; acquiring relative moving information between the vehicle and the target; estimating a first estimated position and first estimated time of the target that appears in a display region of the transparent display according to the first relative position of the target, the first time point and the relative moving information between the vehicle and the target; and displaying prompting information corresponding to the target on the display region of the transparent display according to the first estimated time, the first estimated position of the target and the first identification information of the target.

One embodiment of the present disclosure provides a system of displaying information. The system includes: a transparent display, a first external image circuit, a speed sensing apparatus and a processor. The transparent display is configured on a vehicle. The first external image circuit is configured to capture an image including a target at a first time point. The first external image circuit is configured to acquire a first relative position of the target. The speed sensing apparatus is configured to acquire relative moving information between the vehicle and the target. The processor is configured to identify the target in the image. The processor is configured to estimate a first estimated position and first estimated time of the target that appears in a display region of the transparent display according to the first relative position of the target, the first time point and the relative moving information between the vehicle and the target; and the processor is further configured to display prompting information corresponding to the target on the display region of the transparent display according to the first estimated time, the first estimated position of the target and the first identification information of the target.

In order to make the present disclosure more obvious and comprehensible, embodiments accompanied with figures are described in detail below.

BRIEF DESCRIPTION OF THE DRAWINGS

FIG. 18 is a flowchart of displaying prompting information corresponding to a target on a display region of another transparent display according to a further exemplary embodiment.

DETAILED DESCRIPTION OF DISCLOSED EMBODIMENTS

Figure 1:
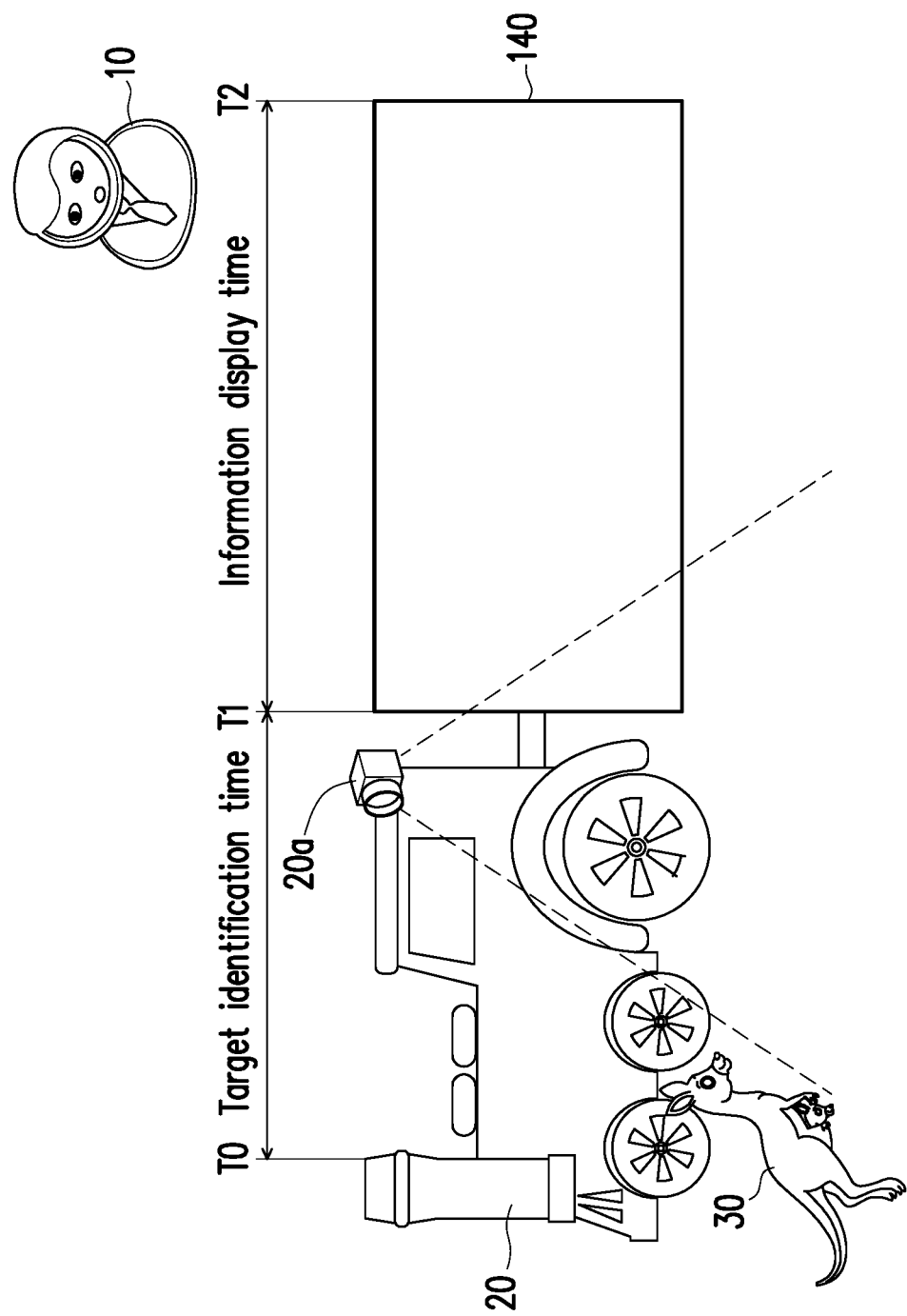
FIG. 1 is a schematic diagram of information display time of a transparent display.

A description will now be made to exemplary embodiments of the present disclosure by referring to drawings. In addition, wherever possible, components/structural members using same reference numbers in the drawings and implementation modes refer to same or similar parts. In addition, it should be understood that terms such as "first" and "second" may be used for describing various components herein, but these assemblies shall not be limited by these terms. These terms are only used for distinguishing one component from another component. For example, a first data capturing circuit may be referred as a second data capturing circuit without departing from the concept scope of the present disclosure. Furthermore, similarly, the second data capturing circuit may be referred as the first data capturing circuit.

FIG. 1 is a schematic diagram of information display time of a transparent display.

Referring to FIG. 1, in one exemplary embodiment, a transparent display 140 is configured on a vehicle 20. An external image circuit 20a is mounted in front of the transparent display 140 and/or the vehicle 20. Before a target 30 enters a visual range of a user 10, the external image circuit 20a captures an image including the target 30 at T0. T0 is start time when the external image circuit 20a may capture the target image including the target 30. A processor 100 is configured to identify the target 30 in the image, and to display relevant information of the target 30 on a display region of the transparent display 140 after the identification is completed. That is to say, before the target 30 enters the transparent display 140, the external image circuit 20a acquires target information in advance. Furthermore, the processor 100 identifies the target within target identification time from T0 to T1, and then displays the relevant information of the target 30 on the display region of the transparent display 140 within information display time from T1 to T2. In another exemplary embodiment, the transparent display 140 may be a head-mounted display that is not required to be configured on the vehicle 20. In addition, the external image circuit 20a is configured on the vehicle 20, and is connected with the transparent display 140. In another exemplary embodiment, the external image circuit 20a also may include a programmable processing unit, a microprocessor, an Application Specific Integrated Circuit (ASIC), a Programmable Logic Device (PLD) or other similar circuit modules for completing a function of identifying the target 30. The present disclosure is not limited thereto.

Figure 2A:
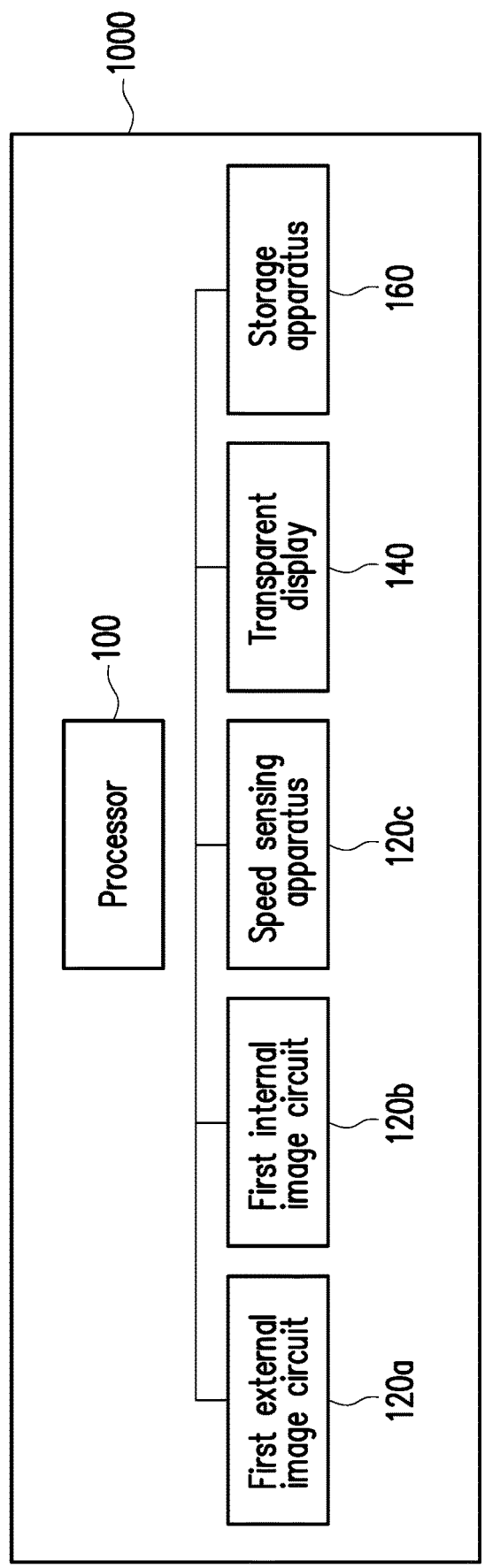
FIG. 2A is a schematic diagram of a system of displaying information according to one exemplary embodiment.

FIG. 2A is a schematic diagram of a system of displaying information according to one exemplary embodiment of the present disclosure.

Referring to FIG. 1 and FIG. 2A at the same time, a system of displaying information 1000 includes a processor 100, a first external image circuit 120a, a first internal image circuit 120b, a speed sensing apparatus 120c, a transparent display 140 and a storage apparatus 160. The processor 100, the first external image circuit 120a, the first internal image circuit 120b, the speed sensing apparatus 120c, the transparent display 140 and the storage apparatus 160 may be coupled with one another in a wired or wireless manner.

The processor 100 is configured to control operation of the system of displaying information 1000. For example, the processor 100 may be a Central Processing Unit (CPU), or other programmable microprocessors for general purposes or special purposes, a Digital Signal Processor (DSP), a programmable controller, an Application Specific Integrated Circuit (ASIC) or other similar modules or a combination of the above-mentioned modules.

The first external image circuit 120a and the first internal image circuit 120b are configured to capture images. The first external image circuit 120a is configured in front of the vehicle 20 to capture an external image, and the first internal image circuit 120b is configured to capture an image of a user 10 in the vehicle 20.

Figure 2B:
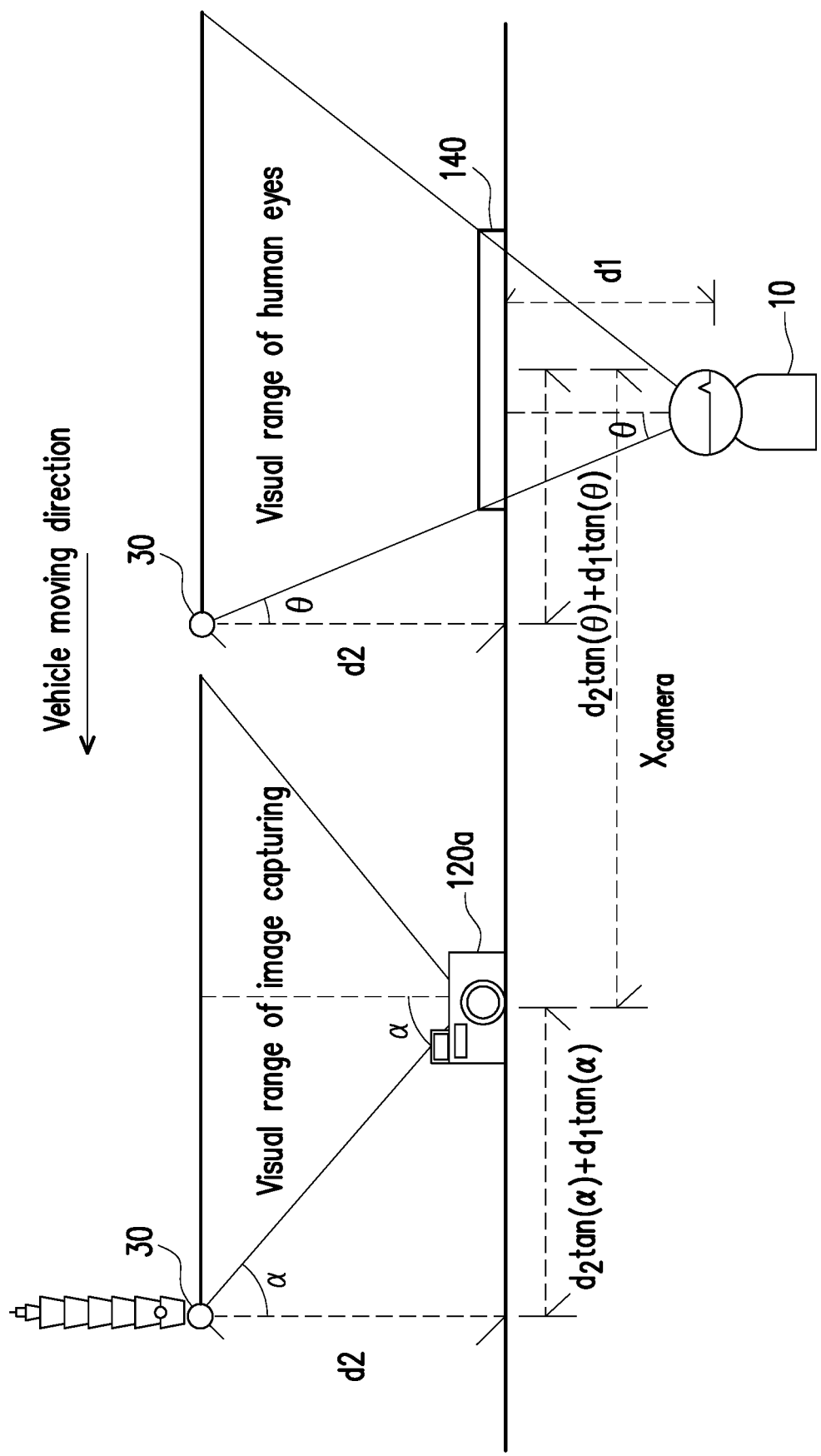
FIG. 2B is a schematic diagram that a set position of a first external image circuit is related to the maximum operation time of a system of displaying information according to one exemplary embodiment.

In the present exemplary embodiment, a set position of the first external image circuit 120a may be related to the maximum operation time of the system of displaying information 1000 (see FIG. 2B). A relative acceleration between the vehicle 20 and a target 30 accords with a relational expression as follows:

$$V_{rel} \le \frac{x_{camera} + (\tan(\alpha) - \tan(\theta))(d_2 + d_1)}{t_{com}},$$

wherein $V_{rel}$ is a relative speed between the user 10 and the target 30; $t_{com}$ is the maximum operation time; $x_{camera}$ is a central distance between the first external image circuit 120a for capturing the external image and the transparent display 140; a is a half angle of a visual range of the first external image circuit 120a; θ is a half angle of a visual range of the user 10; $d_1$ is a distance between the user 10 and the transparent display 140; and $d_2$ is a distance between the target 30 and the transparent display 140.

The maximum operation time of the system of displaying information 1000 is time that the system of displaying information 1000 completes identification of the target 30 before the target 30 enters the visual range of the user 10.

Figure 2C:
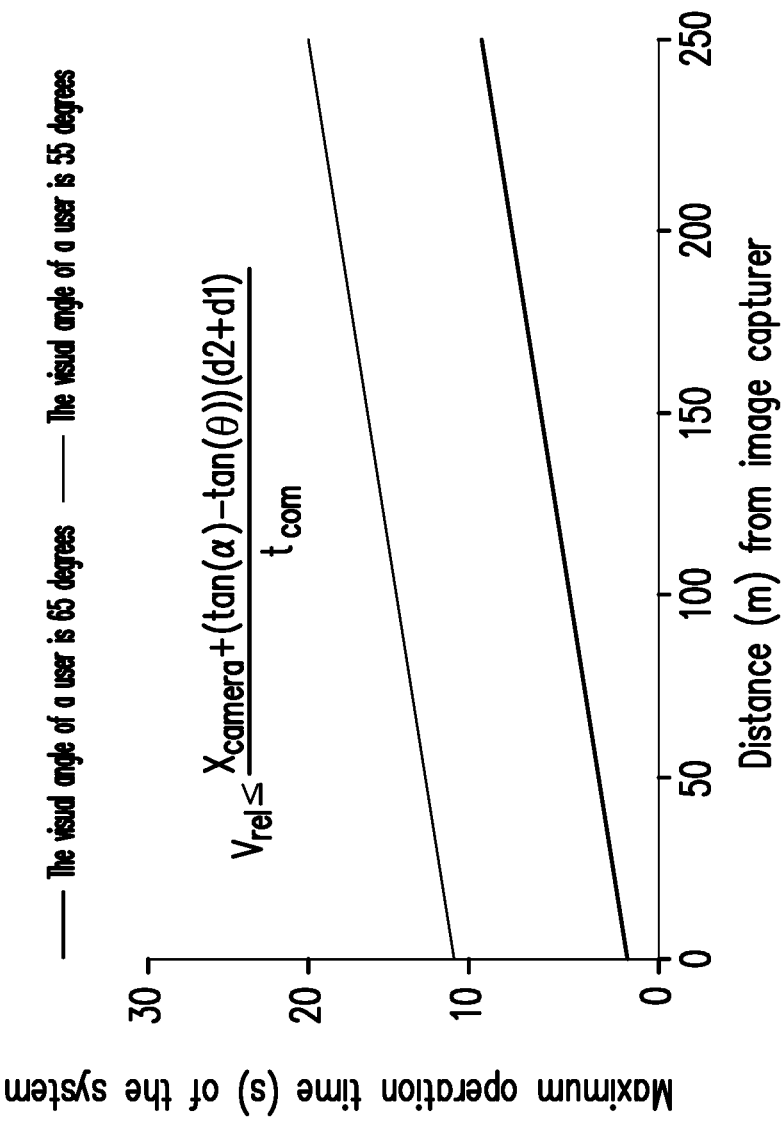
FIG. 2C is a schematic diagram of a relationship between the maximum operation time of a system of displaying information and a set distance of a first external image circuit according to one exemplary embodiment.

FIG. 2C is a schematic diagram of a relationship between the maximum operation time of a system of displaying information and a set distance of a first external image circuit according to one exemplary embodiment. Furthermore, Table 1 is a list of set distances of the first external image circuit 120a and the maximum operation time of the system of displaying information 1000 when a visual angle of the user 10 is 65 degrees and 55 degrees respectively.

Referring to FIG. 2C, in an example that the relative speed $V_r$ et between the user 10 and the target 30 is 100 kilometres/hour (for example, the vehicle 20 is a Tze-Chiang train) and a wide-field camera with a focal length of 10 mm (a is 65 degrees), when display information of the transparent display 140 moves along with the target, and eyes of the user 10 are spaced from the display information by 1 meter, and enjoys target 30 that is 418 meters away, maximum operation time ranges of the system of displaying information 1000 are as shown in FIG. 2C and Table 1.

For example, when the set distance of the first external image circuit 120a is 5 meters, and the visual angle of the user 10 is 65 degrees and 55 degrees respectively, the maximum operation time of the system of displaying information 1000 is 0.18 seconds and 11.04 seconds respectively. That is to say, the system of displaying information 1000 takes 0.18 seconds or 11.04 seconds to identify the target 30, and the target 30 may enter the transparent display 140 after 0.18 seconds or 11.04 seconds.

Referring to FIG. 2A again, the first internal image circuit 120b is configured to sense the user 10 in the vehicle 20. For example, the first internal image circuit 120b includes a human eye tracking system or a human eye tracking circuit, which can be used for judging the visual angle of the user 10 and gazed scenery. In one exemplary embodiment, a general type eyeball identification module may be adopted to sense a face position or eye positions of the user 10 and calculate the visual range of the user. The descriptions thereof are omitted herein.

For example, the first external image circuit 120a and the first internal image circuit 120b may adopt video cameras or cameras with Charge Coupled Device (CCD) lenses, Complementary Metal Oxide Semiconductor transistor (CMOS) lenses and infrared lenses.

The speed sensing apparatus 120c is, for example, instrument including a vehicle speedometer, a gyroscope, a Global Positioning System (GPS) and the like which can measure speeds and accelerations, and may be configured to acquire moving information of the vehicle 20.

The transparent display 140 is configured to display information. The transparent display 140 has a light penetrability to a certain extent, and can display a background behind a panel. That is to say, a display region of the transparent display 140 is visually penetrable. The transparent display 140 of the present exemplary embodiment may be applicable to various occasions such as windows in a building (such as an observation platform, an aquarium and a museum), exhibition shop windows, and vehicle windows and displays.

The storage apparatus 160 is configured to store data, and may be a fixed or mobile Random Access Memory (RAM) in any type, a Read-Only Memory (ROM), a flash memory or a similar component or a combination of the above-mentioned components. For example, the processor 100 may identify the sensed target 30 according to an object database in the storage apparatus 160 on the basis of an image sensed by the first external image circuit 120a. Or, the processor 100 may search information preferred by the user from a user database in the storage apparatus 160 on the basis of the user 10 sensed by the first internal image circuit 120b.

In the present exemplary embodiment, the storage apparatus 160 stores a plurality of code segments. The code segments may be executed by the processor 100 after being installed. For example, the storage apparatus 160 includes a plurality of modules. These modules are configured to respectively execute operations in the system of displaying information 1000. Each module consists of one or multiple code segments. However, the present disclosure is not limited to this. The operations of the system of displaying information 1000 may also be realized by means of other hardware forms.

In one exemplary embodiment, the operations executable by the system of displaying information 1000 may also be integrated into a single transparent display 140. For example, FIG. 3 is a schematic diagram of a transparent display with an information display system function according to one exemplary embodiment of the present disclosure.

Figure 3:
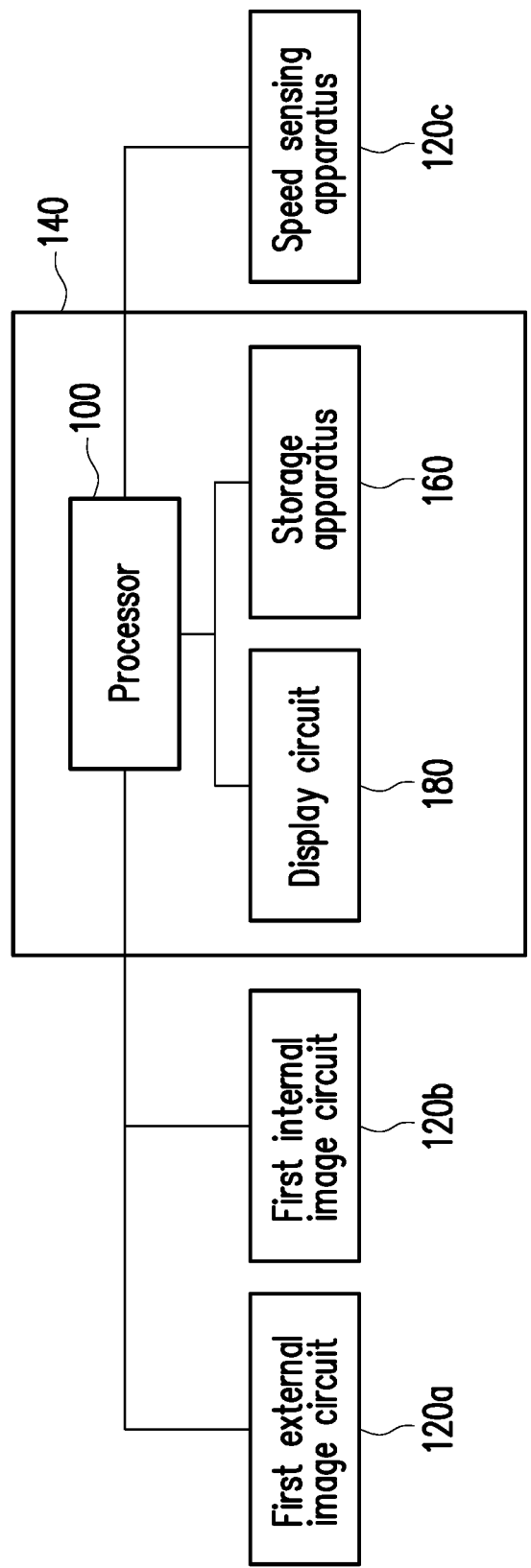
FIG. 3 is a schematic diagram of a transparent display with an information display system function according to one exemplary embodiment of the present disclosure.

Referring to FIG. 3, the transparent display 140 includes a processor 100, a display circuit 180 and a storage apparatus 160. The processor 100, the first external image circuit 120a, the first internal image circuit 120b, the speed sensing apparatus 120c, the display circuit 180 and the storage apparatus 160 may be coupled with one another in a wired or wireless manner.

The display circuit 180 is configured to display an image in a display region of the transparent display 140. The display circuit 180 may be a display device providing a display function, such as a Liquid Crystal Display (LCD), a

TABLE 1

| | Image capturing distance (m) | | | | | | | | | | |
|---|---|---|---|---|---|---|---|---|---|---|---|
| | 0 | 5 | 10 | 15 | 20 | 25 | 30 | 35 | 40 | 45 | 50 |
| Operation time (S) of the system at a visual angle of 55 degrees of a user | 10.86 | 11.04 | 11.22 | 11.4 | 11.58 | 11.76 | 11.94 | 12.12 | 12.3 | 12.48 | 12.66 |
| Operation time (S) of the system at a visual angle of 65 degrees of a user | 0 | 0.18 | 0.36 | 0.54 | 0.72 | 0.9 | 1.08 | 126 | 1.44 | 162 | 1.8 |

Light-Emitting Diode (LED) including an inorganic LED display or an organic LED display, a Field Emission Display (FED), a projection type display and a wearable display.

In the present exemplary embodiment, the storage apparatus 160 of the transparent display 140 stores a plurality of code segments. The code segments may be executed by the processor 100 after being installed. For example, the storage apparatus 160 includes a plurality of modules. These modules are configured to respectively execute operations in the transparent display 140. Each module consists of one or more code segments. However, the present disclosure is not limited to this. The operations of the transparent display 140 may also be realized by means of other hardware forms.

In order to facilitate explanation, the following exemplary embodiment is described by using the system of displaying information 1000 of FIG. 2A, and the same exemplary embodiment also may be applied to the transparent display 140 of FIG. 3.

Figure 4:
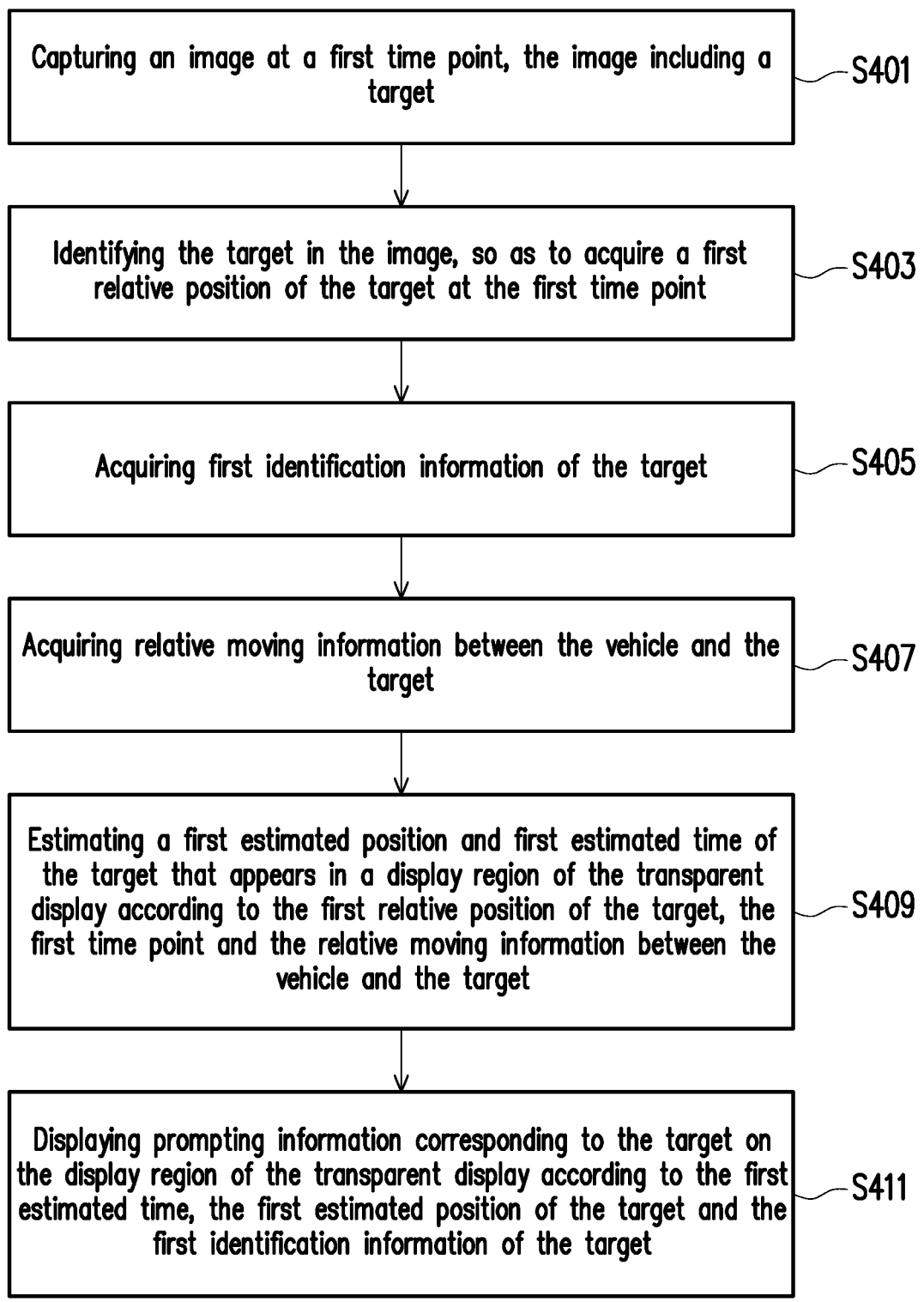
FIG. 4 is a flowchart of a method of displaying information according to one exemplary embodiment of the present disclosure.
Figure 5:
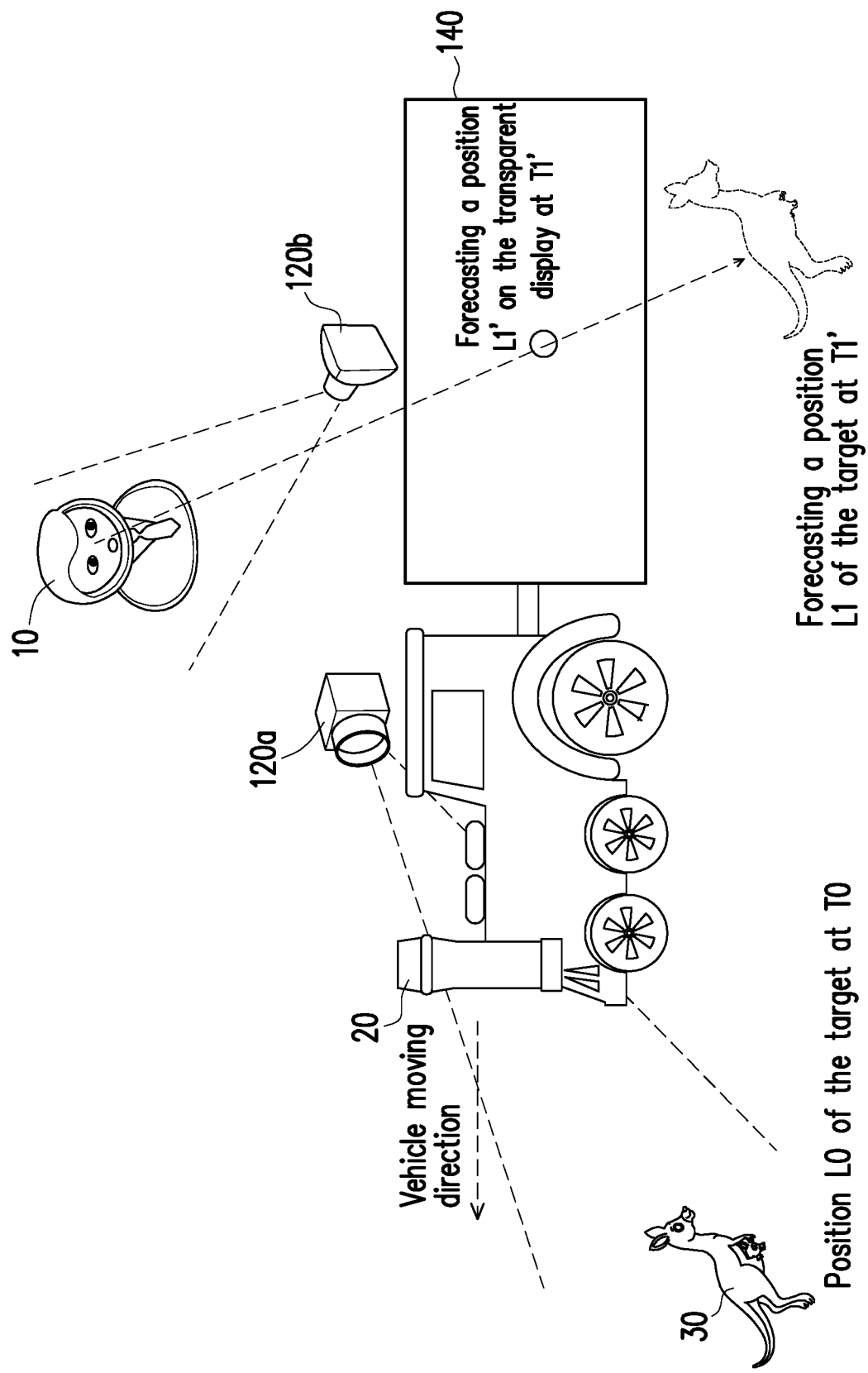
FIG. 5 is a schematic diagram of forecasting a target within a visual range of a user according to one exemplary embodiment of the present disclosure.

FIG. 4 is a flowchart of a method of displaying information according to one exemplary embodiment of the present disclosure. FIG. 5 is a schematic diagram of forecasting a target within a visual range of a user according to one exemplary embodiment of the present disclosure.

Referring to FIG. 2A, FIG. 4 and FIG. 5, in Step S401, the first external image circuit 120a captures an image outside the transparent display 140 at a first time point T0. For example, the image includes the target 30.

In Step S403, the processor 100 compares the image captured by the first external image circuit 120a with relevant information, stored in the storage apparatus 160, of the target 30, so as to identify the target 30 in the image. In addition, the first external image circuit 120a acquires a first relative position L0 of the target 30 at the first time point T0. In one exemplary embodiment, the vehicle 20 may be a sightseeing tram, a bus, a light-rail train and the like which include multiple continuously arranged compartments. Each compartment may be provided with the transparent display 140 separately.

In Step S405, the processor 100 may acquire first identification information of the target 30. The first identification information is acquired by comparing the image captured by the first external image circuit 120a with the relevant information, stored in the storage apparatus 160, of the target 30.

In Step S407, the speed sensing apparatus 120c acquires vehicle moving information of the vehicle 20, and acquire relative moving information between the vehicle 20 and the target 30 according to the vehicle moving information. For example, the vehicle moving information includes a relative acceleration, a relative speed, a moving direction and the like.

In Step S409, the processor 100 estimates a first estimated position L1' and first estimated time T1' of the target 30 that appears in the display region of the transparent display 140 according to the first relative position L0 of the target 30, the first time point T0 and the relative moving information between the vehicle 20 and the target 30. It should be noted that the present exemplary embodiment does not limit an execution order of Steps S403, S405 and S407.

Furthermore, in Step S411, the processor 100 displays prompting information corresponding to the target 30 on the display region of the transparent display 140 according to the first estimated time T1', the first estimated position L1' of the target 30 and the first identification information of the target 30.

Figure 6B:
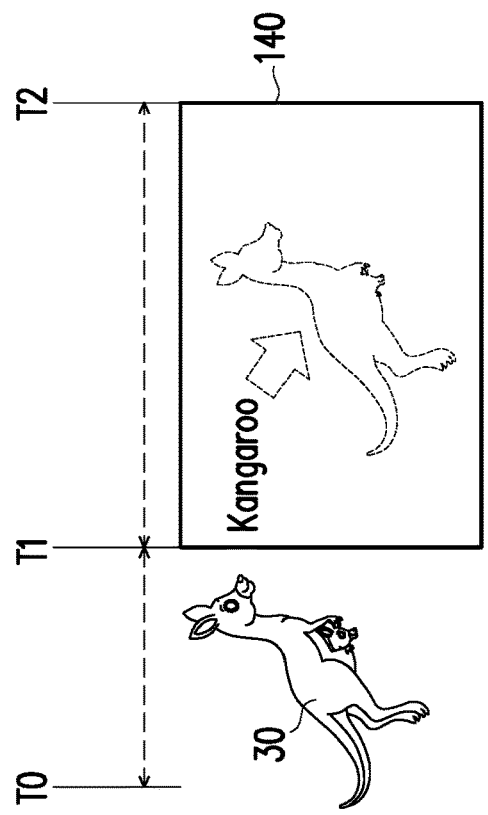
FIG. 6A and FIG. 6B respectively illustrate a schematic diagram of prompting information for making a prompt by means of words and a schematic diagram of prompting information for making a prompt by means of words and patterns.
Figure 6A:
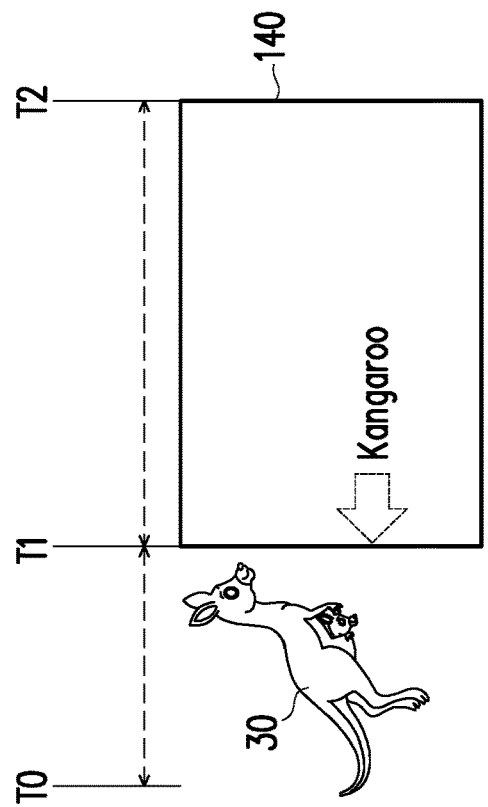
Figures 7A, 7B:
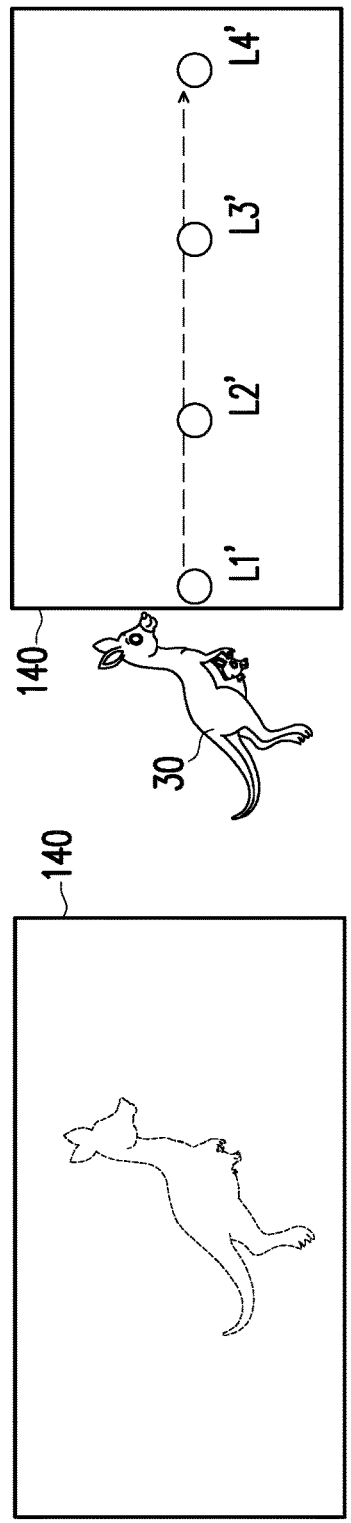
FIG. 7A to FIG. 7D illustrate a forecast schematic diagram of target identification information, a forecast schematic diagram of a target moving path, a forecast schematic diagram of an arrow indication of a target appearing position and a forecast schematic diagram of a countdown of target appearing time, which respectively make prompts by means of patterns.

FIG. 6A and FIG. 6B respectively illustrate a schematic diagram of prompting information for making a prompt by means of words and a schematic diagram of prompting information for making a prompt by means of words and patterns, wherein a period from T0 to T1 is target identification time, and a period from T1 to T2 is information display time. FIG. 7A to FIG. 7D illustrate a forecast schematic diagram of target identification information, a forecast schematic diagram of a target moving path, a forecast schematic diagram of an arrow indication of a target appearing position and a forecast schematic diagram of a countdown of target appearing time, which respectively make prompts by means of patterns. FIG. 8A and FIG. 8B are schematic diagrams of making a dynamic picture prompt for a forecast of a countdown corresponding to target appearing time by means of words and patterns.

Referring to FIGS. 6A to 8B, for example, the promoting information may be at least one of the image of the target 30, a position message, a moving path and time that prompts appearing of the target 30. Furthermore, the image of the target 30, the position message, the moving path and the time that prompts appearing of the target 30 may be expressed by using words or patterns.

In addition to displaying the information on the transparent display 140 according to the sensed information of the target 30, in another exemplary embodiment, the system of displaying information 1000 may display the information in further consideration of a visual range of a passenger in the vehicle 20.

Figure 9A:
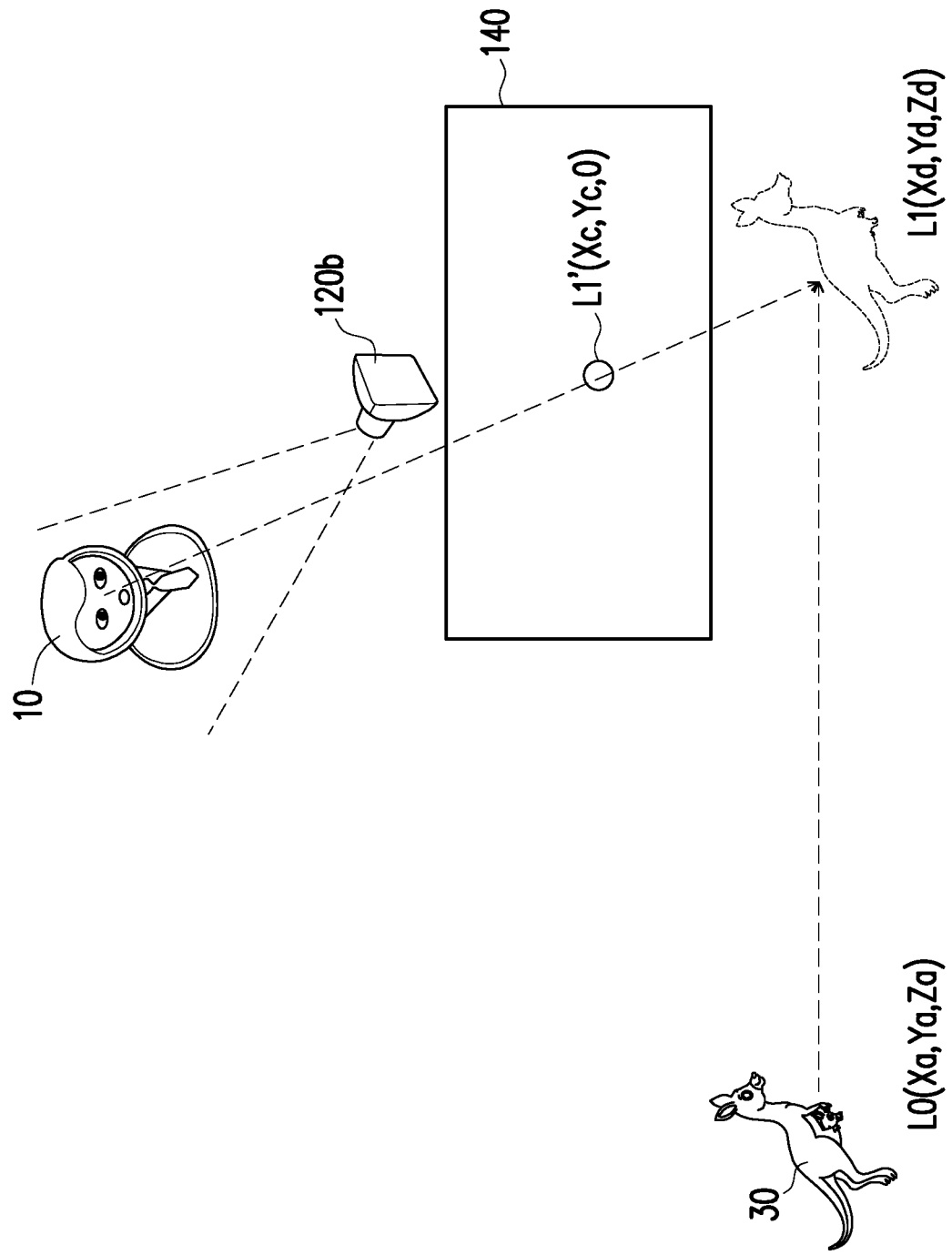
FIG. 9A is a schematic diagram of acquiring a first estimated position of a target based on a visual range of a user according to one exemplary embodiment.
Figure 9B:
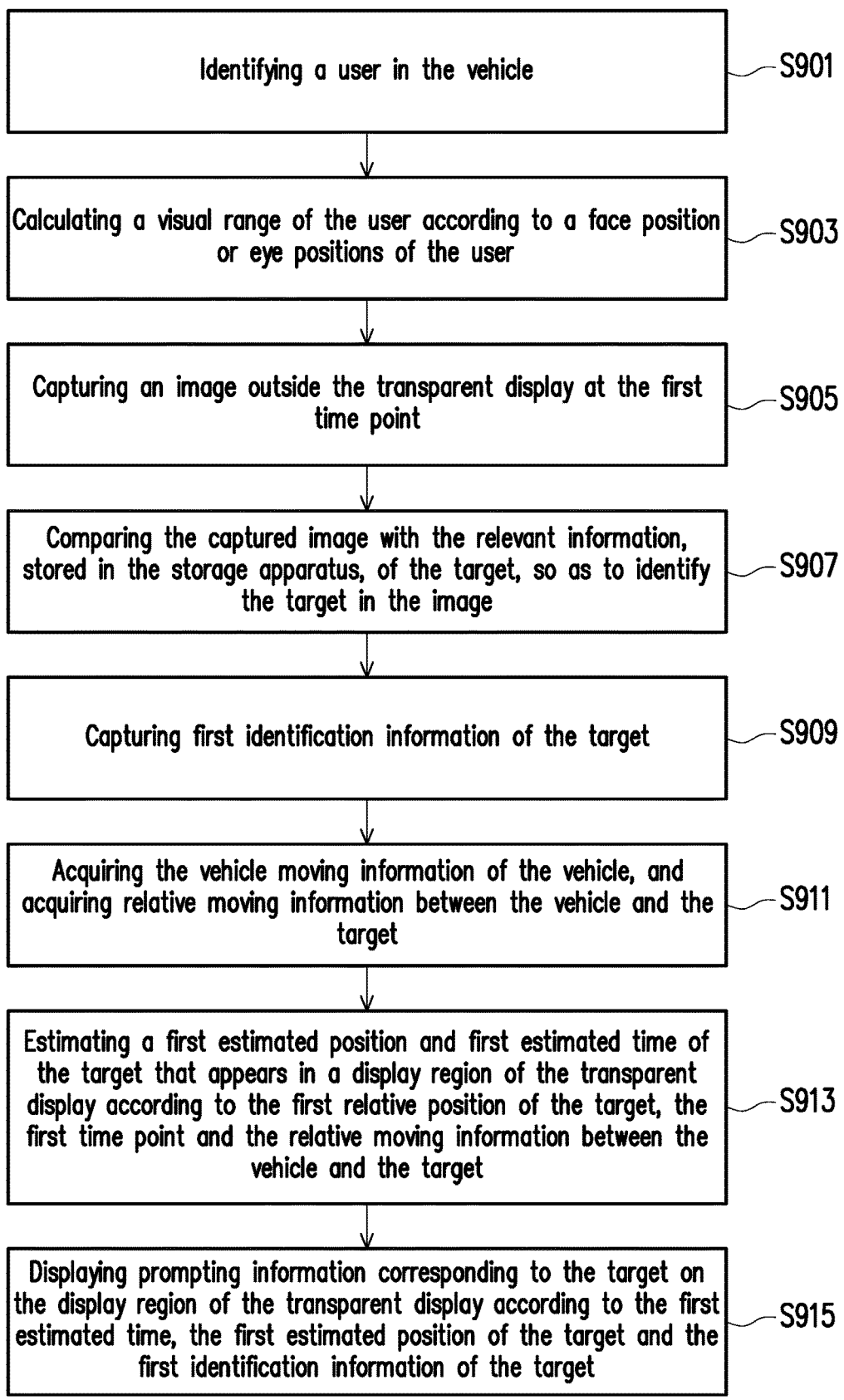
FIG. 9B is a flowchart of acquiring a first estimated position of a target based on a visual range of a user according to another exemplary embodiment.

FIG. 9A is a schematic diagram of acquiring a first estimated position of a target according to a visual range of a user. FIG. 9B is a flowchart of acquiring a first estimated position of a target based on a visual range of a user according to another exemplary embodiment.

Referring to FIG. 2, FIG. 5, FIG. 9A and FIG. 9B, in Step S901, the first internal image circuit 120b may identify the user 10 in the vehicle 20.

In Step S903, the processor 100 senses a face position or eye positions of the user 10, and calculate the visual range of the user 10. In one exemplary embodiment, a general type eyeball identification module may be adopted to sense a face position or eye positions of the user 10 and calculate the visual range of the user 10. The descriptions thereof are omitted herein.

In Step S905, the first external image circuit 120a captures an image outside the transparent display 140 at the first time point T0. This image, for example, is an image including the target 30.

In Step S907, the processor 100 compares the image captured by the first external image circuit 120a with the relevant information, stored in the storage apparatus 160, of the target 30, so as to identify the target 30 in the image.

In Step S909, the processor 100 acquires first identification information of the target 30. The first identification information is acquired by comparing the image captured by the first external image circuit 120a with the relevant information, stored in the storage apparatus 160, of the target 30.

In Step S911, the speed sensing apparatus 120c acquires vehicle moving information of the vehicle 20, and acquire relative moving information between the vehicle 20 and the target 30 according to the vehicle moving information. For example, the vehicle moving information includes a relative acceleration, a relative speed, a moving direction and the like.

In Step 913, the processor 100 estimates a first estimated position L1' and first estimated time T1' of the target 30 that appears in the display region of the transparent display 140 according to the first relative position L0 of the target 30, the first time point T0 and the relative moving information between the vehicle 20 and the target 30. It should be noted that the present exemplary embodiment does not limit an execution order of Steps S903, S905 and S911.

For example, in Step S913, the processor 100 may calculate a position L1' of the target 30 that is projected to the display region of the transparent display 140 by using an algorithm of fusing visual lines of the target 30 and the user 10. Specifically, the processor 100 may set a central point of the transparent display 140 as a position origin. Coordinates of the first relative position L0 of the target 30 are (Xa, Ya, Za). Coordinates of a second relative position L1 of the target 30 are (Xd, Yd, Zd). Coordinates of the position L1' of the target 30 that is projected to the display region of the transparent display 140 are (Xc, Yc, 0). Vx is the relative moving speed between the vehicle 20 and the target 30, thereby solving Xc=Xb+[Xa−Xb+Vx(T1−T0)]*Zb/(Za−Zb), and Yc=Yb+(Ya−Yb)*Zb/(Za−Zb), and then the position L1' of the target 30 that is projected to the display region of the transparent display 140 is acquired (as shown in FIG. 9A).

Finally, in Step S915, the processor 100 displays prompting information corresponding to the target 30 on the display region of the transparent display 140 according to the first estimated time T1', the first estimated position L1' of the target 30 and the first identification information of the target 30.

In one exemplary embodiment of the present disclosure, the system of displaying information 1000 may further determine whether to display the prompting information or not according to some conditions.

Figure 10:
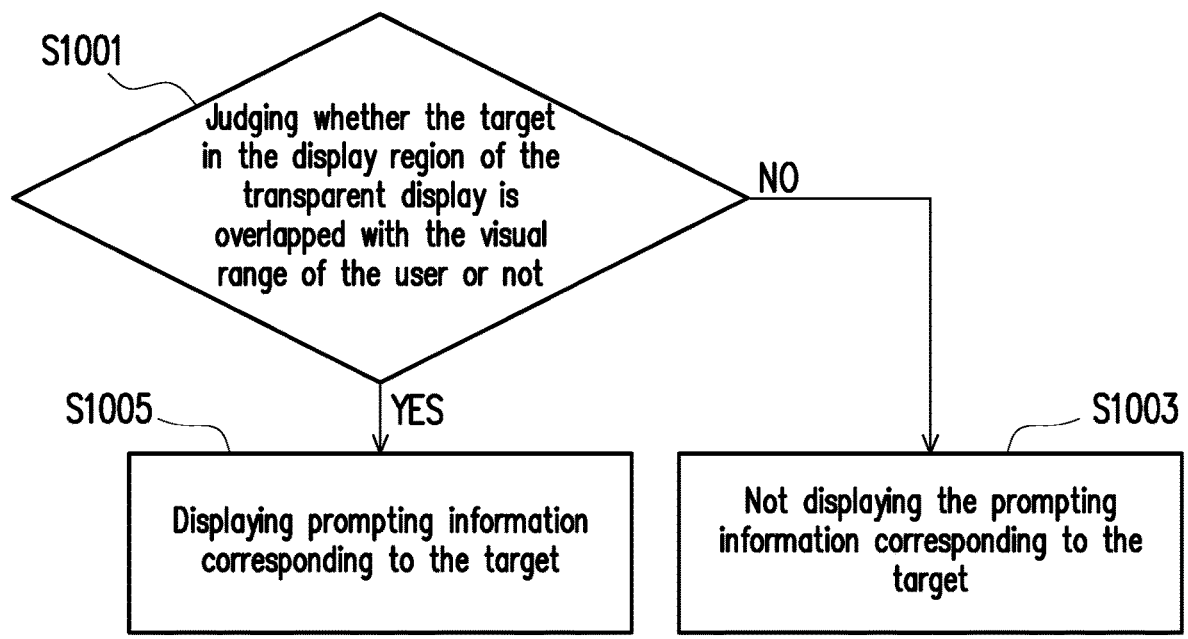
FIG. 10 is a flowchart of determining whether to display prompting information or not based on a visual range of a user according to one exemplary embodiment.

FIG. 10 is a flowchart of determining whether to display prompting information or not based on a visual range of a user according to one exemplary embodiment.

Referring to FIG. 10, in Step S1001, the processor 100 judges whether the target 30 in the display region of the transparent display 140 is overlapped with the visual range of the user 10 or not.

In Step S1003, the processor 100 does not display the prompting information corresponding to the target 30 if the target 30 in the display region of the transparent display 140 is not overlapped with the visual range of the user 10.

In Step S1005, the processor 100 displays the prompting information corresponding to the target 30 if the target 30 in the display region of the transparent display 140 is overlapped with the visual range of the user 10.

Figure 11:
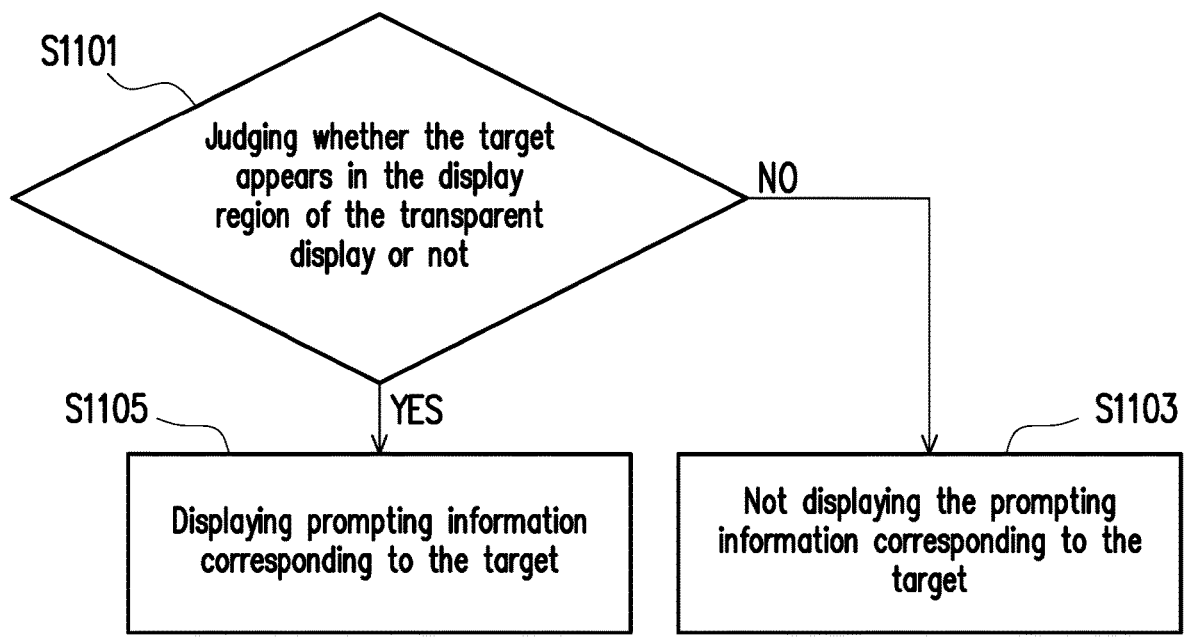
FIG. 11 is a flowchart of determining whether to display prompting information or not based on an actual position of a target according to one exemplary embodiment.

FIG. 11 is a flowchart of determining whether to display prompting information or not based on an actual position of a target according to one exemplary embodiment.

Referring to FIG. 11, in Step S1101, the processor 100 judges whether the target 30 appears in the display region of the transparent display 140 or not.

In Step 1103, the processor 100 does not display the promoting information corresponding to the target 30 if the target 30 does not appear in the display region of the transparent display 140.

In Step 1105, the processor 100 displays the promoting information corresponding to the target 30 if the target 30 appears in the display region of the transparent display 140.

Figure 12:
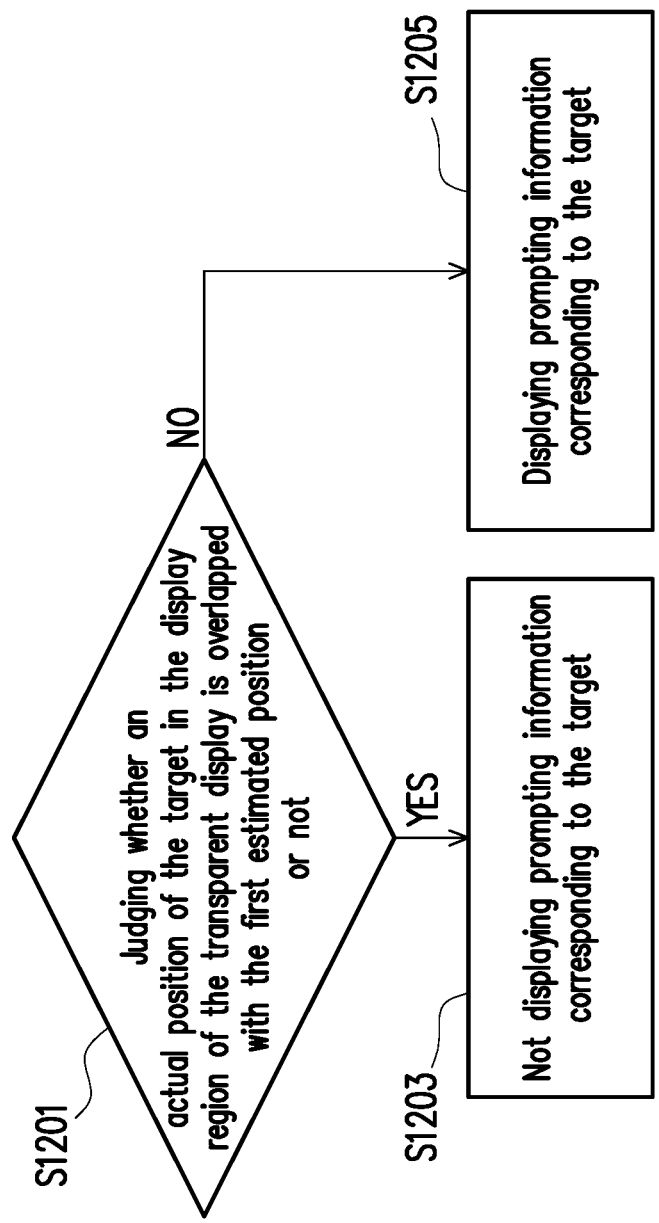
FIG. 12 is a flowchart of determining whether to display prompting information or not based on an actual position of a target according to another exemplary embodiment.

FIG. 12 is a flowchart of determining whether to display prompting information or not based on an actual position of a target according to another exemplary embodiment.

Referring to FIG. 12, in Step S1201, the processor 100 judges whether the actual position of the target 30 in the display region of the transparent display 140 is overlapped or partially overlapped with the first estimated position L1'.

In Step S1203, the processor 100 does not display the prompting information corresponding to the target 30 if the position of the target 30 in the display region of the transparent display 140 is overlapped or partially overlapped with the first estimated position L1'.

In Step S1205, the processor 100 displays the prompting information corresponding to the target 30 if the position of the target 30 in the display region of the transparent display 140 is not overlapped with the first estimated position L1'.

In addition to the basis of a single estimated position, in another exemplary embodiment, the prompting information also may be displayed or may not be displayed according to a plurality of estimated positions.

Figure 13:
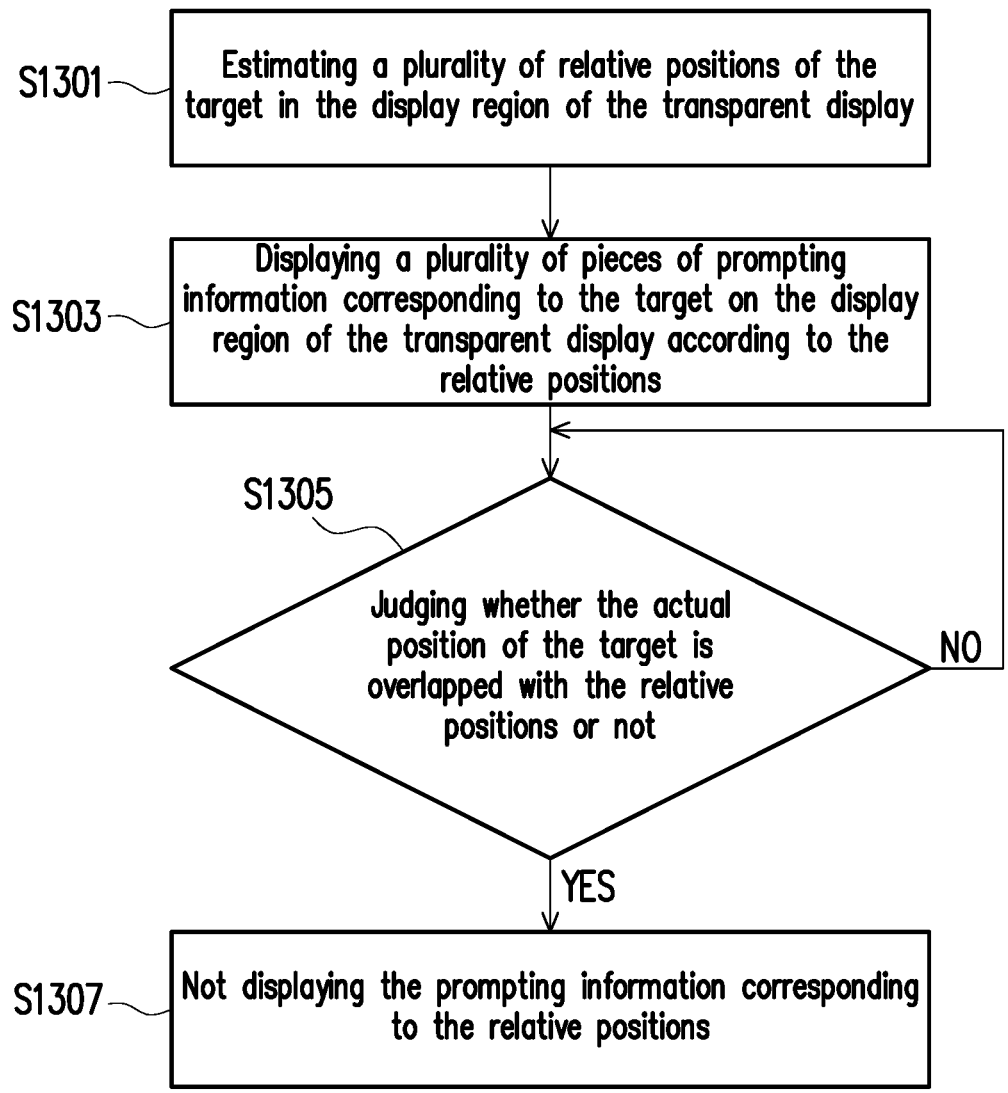
FIG. 13 is a flowchart of determining whether to display prompting information or not based on an actual position of a target according to another exemplary embodiment.

FIG. 13 is a flowchart of determining whether to display prompting information or not based on an actual position of a target according to another exemplary embodiment.

Referring to FIG. 13, in Step S1301, the processor 100 may estimate a plurality of relative positions of the target 30 in the display region of the transparent display 140.

In Step S1303, the processor 100 displays a plurality of pieces of prompting information corresponding to the target 30 on the display region of the transparent display 140 according to the relative positions.

In Step S1305, the processor 100 judges whether the actual position of the target 30 is overlapped or partially overlapped with the relative positions or not.

In Step S1307, the processor 100 does not display the corresponding prompting information if it is judged that the actual position of the target 30 is overlapped or partially overlapped with the relative positions. For example, when FIG. 7B is taken for example, the processor 100 displays a forecast of a moving path of the target 30. L1', L2', L3' and L4' are respectively the multiple relative positions of the target 30 in the display region of the transparent display. When it is judged that the actual position of the target 30 is overlapped or partially overlapped with the relative position L1', the prompting information of the corresponding relative position L1' is not displayed. By parity of reasoning, when it is judged that the actual position of the target 30 is overlapped or partially overlapped with the relative position L2', the prompting information corresponding relative position L2' is not displayed.

The process returns to Step S1305 if it is judged that the actual position of the target 30 is not overlapped with the relative positions.

Figure 14:
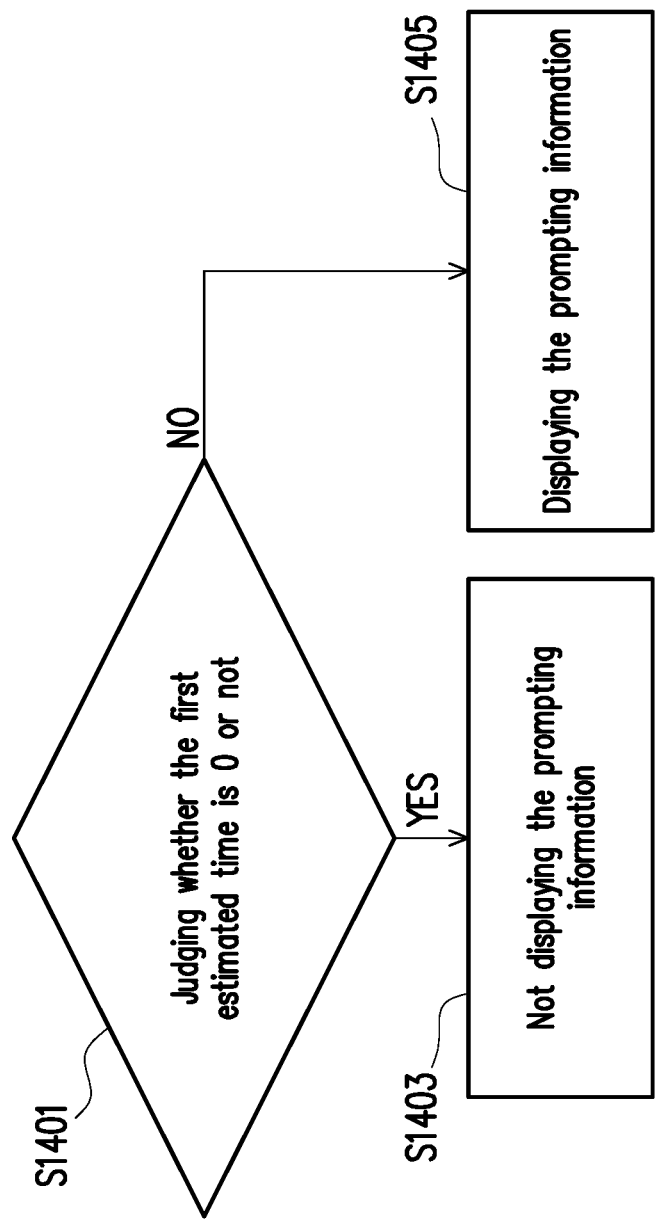
FIG. 14 is a flowchart of determining whether to display prompting information or not based on first estimated time according to one exemplary embodiment.

FIG. 14 is a flowchart of determining whether to display prompting information or not based on first estimated time according to one exemplary embodiment.

Referring to FIG. 14, in Step S1401, the processor 100 judges whether the first estimated time T1' is 0 or not.

In Step S1403, the processor 100 does not display the prompting information if the first estimated time T1' is 0.

In Step S1405, the processor 100 displays the prompting information if the first estimated time T1' is not 0.

Figures 7C, 7D:
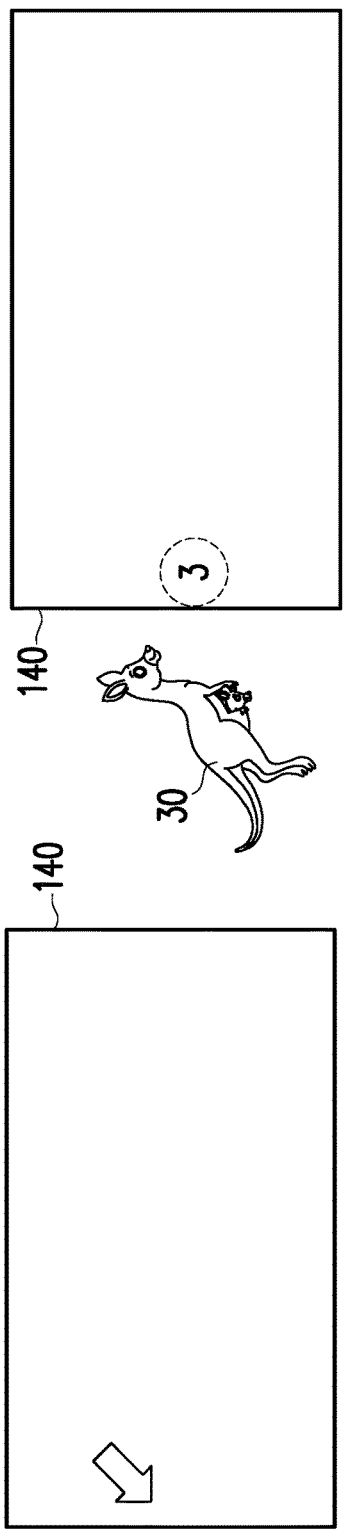
Figure 8A:
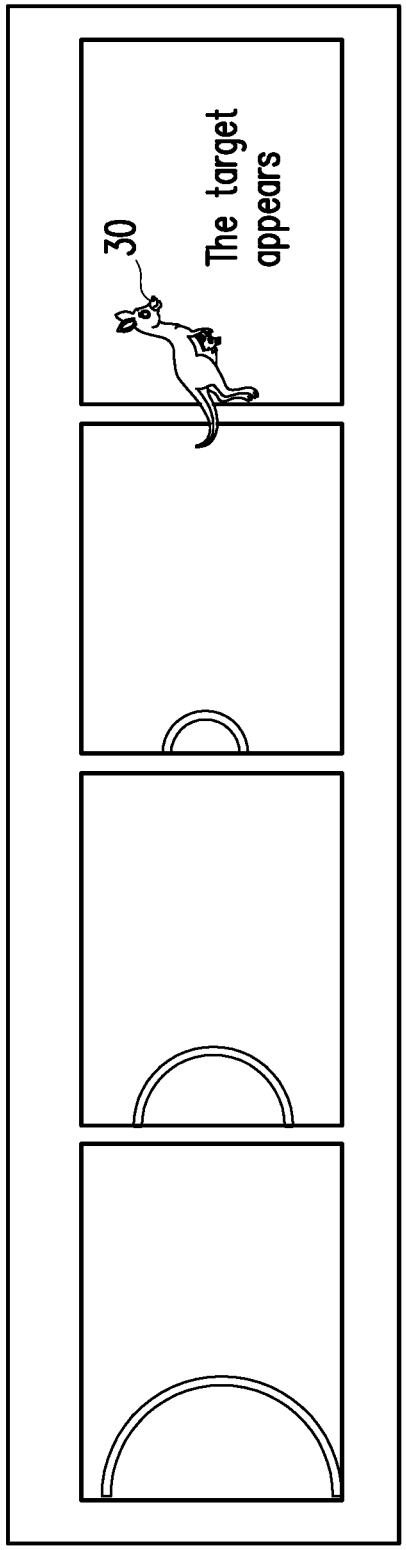
FIG. 8A and FIG. 8B are schematic diagrams of making a dynamic picture prompt for a forecast of a countdown corresponding to target appearing time by means of words and patterns.
Figure 8B:
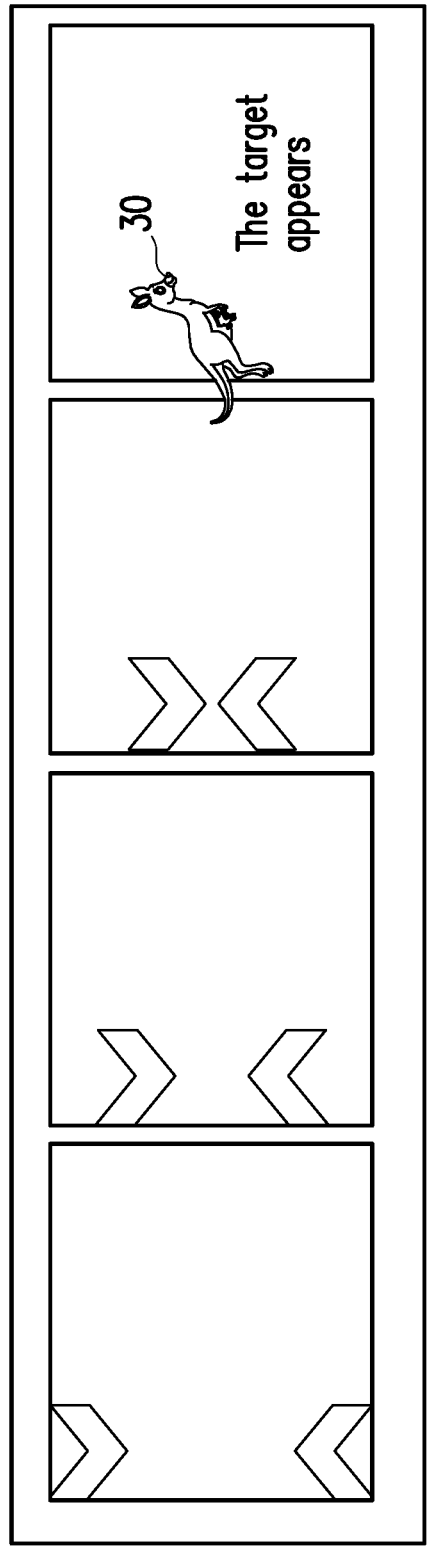

For example, the embodiment as shown in FIG. 14 may display a forecast schematic diagram of a countdown of target appearing time in combination with FIG. 7D. For example, the first estimated time T1' represents the countdown that the target 30 appears in the display region of the transparent display 140. That is to say, for example, when the first estimated time T1' is 3 seconds, the prompting information displayed in FIG. 7D is that the target 30 will appear in the display region of the transparent display 140 after a countdown of 3 seconds. After 3 seconds, the target 30 may appear in the display region of the transparent display 140, and at this moment, the prompting information is not displayed.

In the above-mentioned exemplary embodiment, a description is made by taking one transparent display as an example. In another exemplary embodiment, the method of displaying information of the present disclosure may also be applied to a plurality of transparent displays (for example, the transparent displays configured in multiple compartments in the train).

Figure 15:
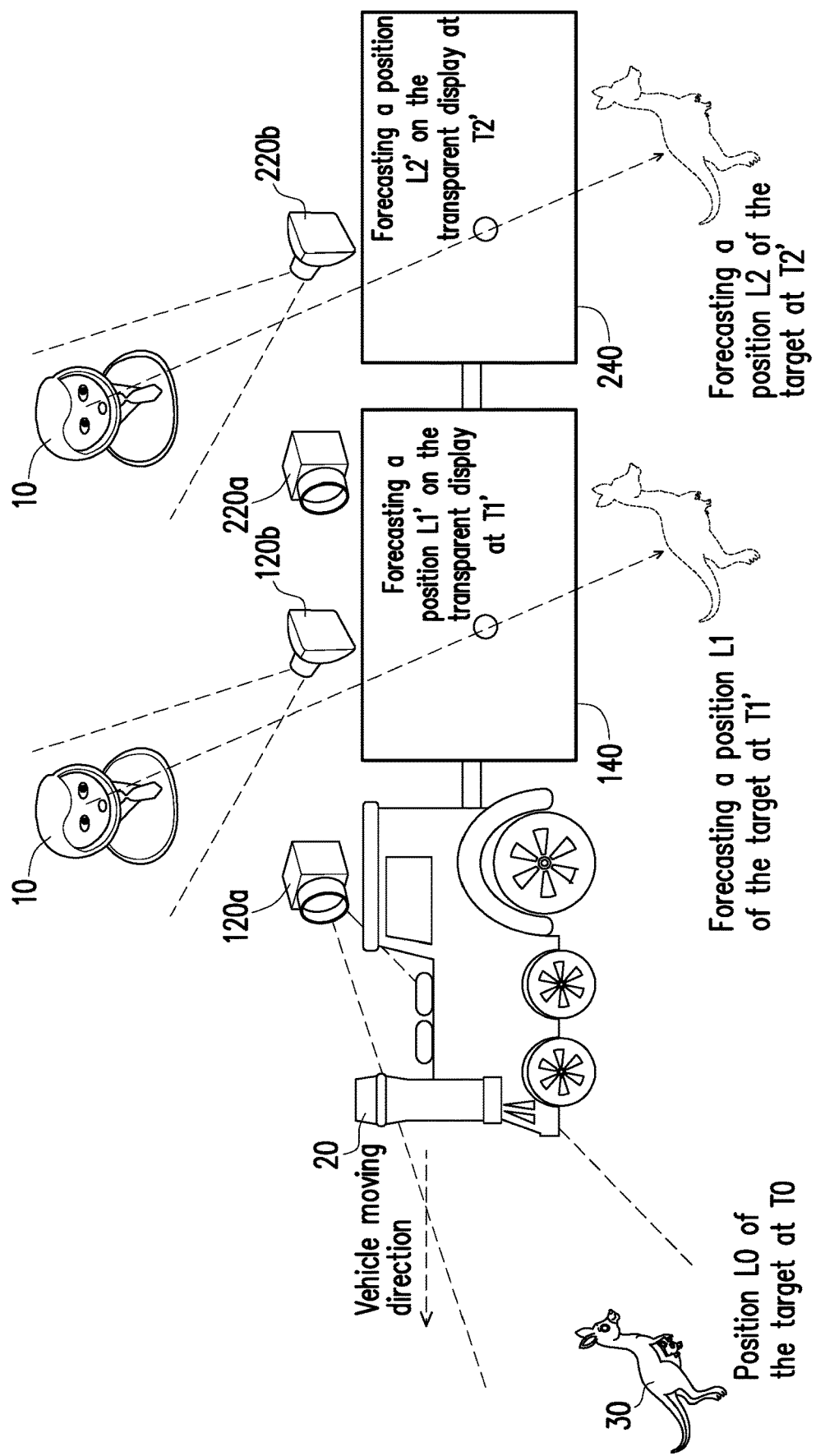
FIG. 15 is a schematic diagram of displaying prompting information corresponding to a target on a display region of another transparent display according to one exemplary embodiment.
Figure 16:
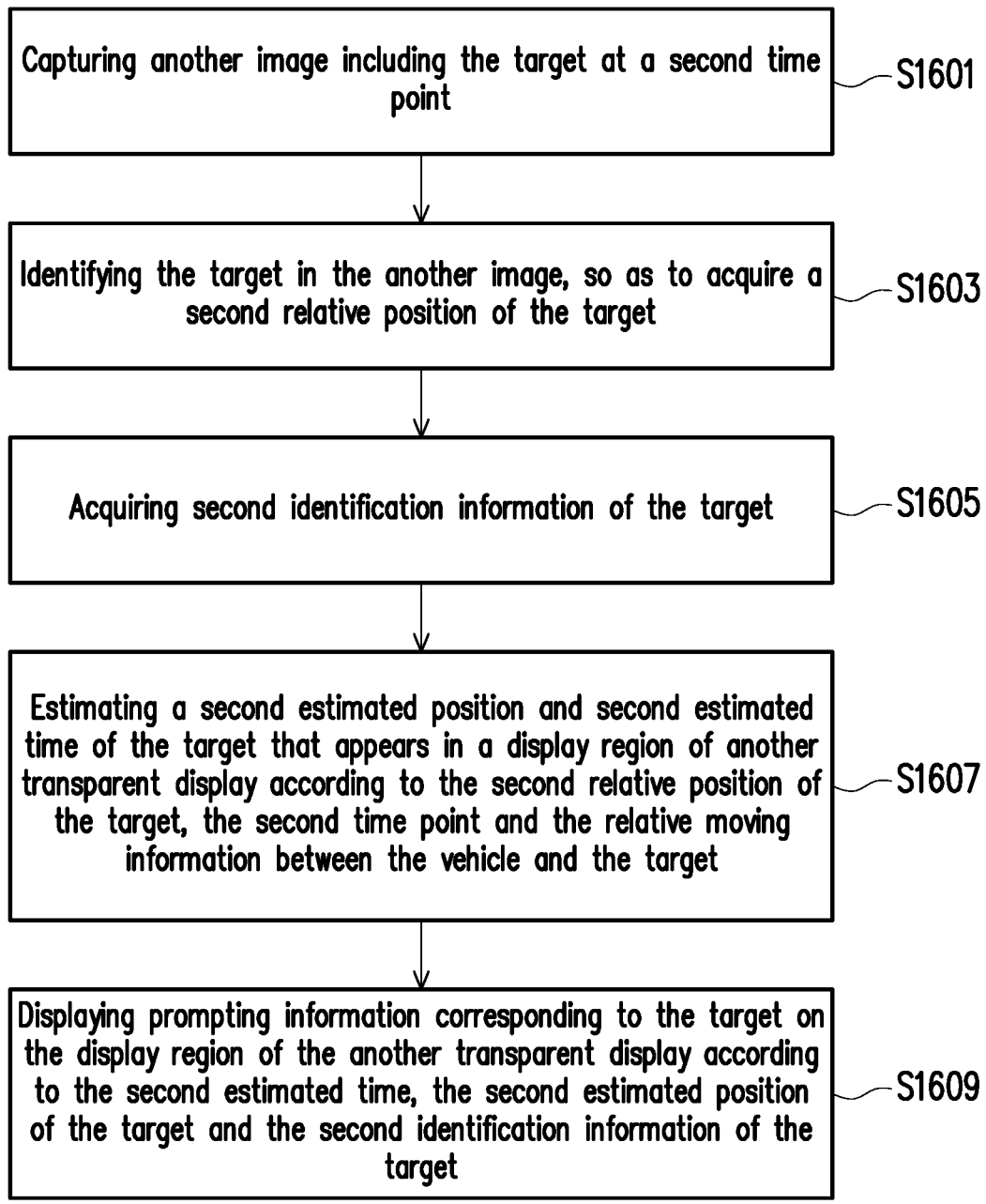
FIG. 16 is a flowchart of displaying prompting information corresponding to a target on a display region of another transparent display according to one exemplary embodiment.

FIG. 15 is a schematic diagram of displaying prompting information corresponding the target on a display region of another transparent display according to one exemplary embodiment. Furthermore, FIG. 16 is a flowchart of displaying prompting information corresponding to a target on a display region of another transparent display according to one exemplary embodiment. In the present exemplary embodiment, a second external image circuit 220a and a second internal image circuit 220b are further configured in the vehicle 20. The second external image circuit 220a is configured to capture an image outside the vehicle 20. The second internal image circuit 220b is configured to capture an image of a user 10 in front of another transparent display 240. The structures of the second external image circuit 220a and the second internal image circuit 220b may be similar to the structures of the first external image circuit 120a and the first internal image circuit 120b, so that the descriptions thereof are omitted herein.

Referring to FIG. 15 and FIG. 16 at the same time, in Step S1601, the second external image circuit 220a captures another image including a target 30 at a second time point T1.

In Step S1603, the processor 100 identifies the target 30 in the another image, so as to acquire a second relative position L1 of the target 30.

In Step S1605, the processor 100 acquires second identification information of the target 30. For example, the second identification information is acquired by comparing the image captured by the second external image circuit 220a with the relevant information, stored in the storage apparatus 160, of the target 30.

In Step S1607, the processor 100 estimates a second estimated position L2' and second estimated time T2' of the target 30 that appears in the display region of the another transparent display 240 according to the second relative position L1 of the target 30, the second time point T1 and the relative moving information between the vehicle and the target 30.

In Step S1609, the processor 100 displays prompting information corresponding to the target 30 on the display region of the another transparent display 240 according to the second estimated time T2', the second estimated position L2' of the target and the second identification information of the target 30.

As the targets appearing on the multiple transparent displays may be the same, in another exemplary embodiment, the pre-acquired identification information may also be transmitted to the next transparent display for displaying.

Figure 17:
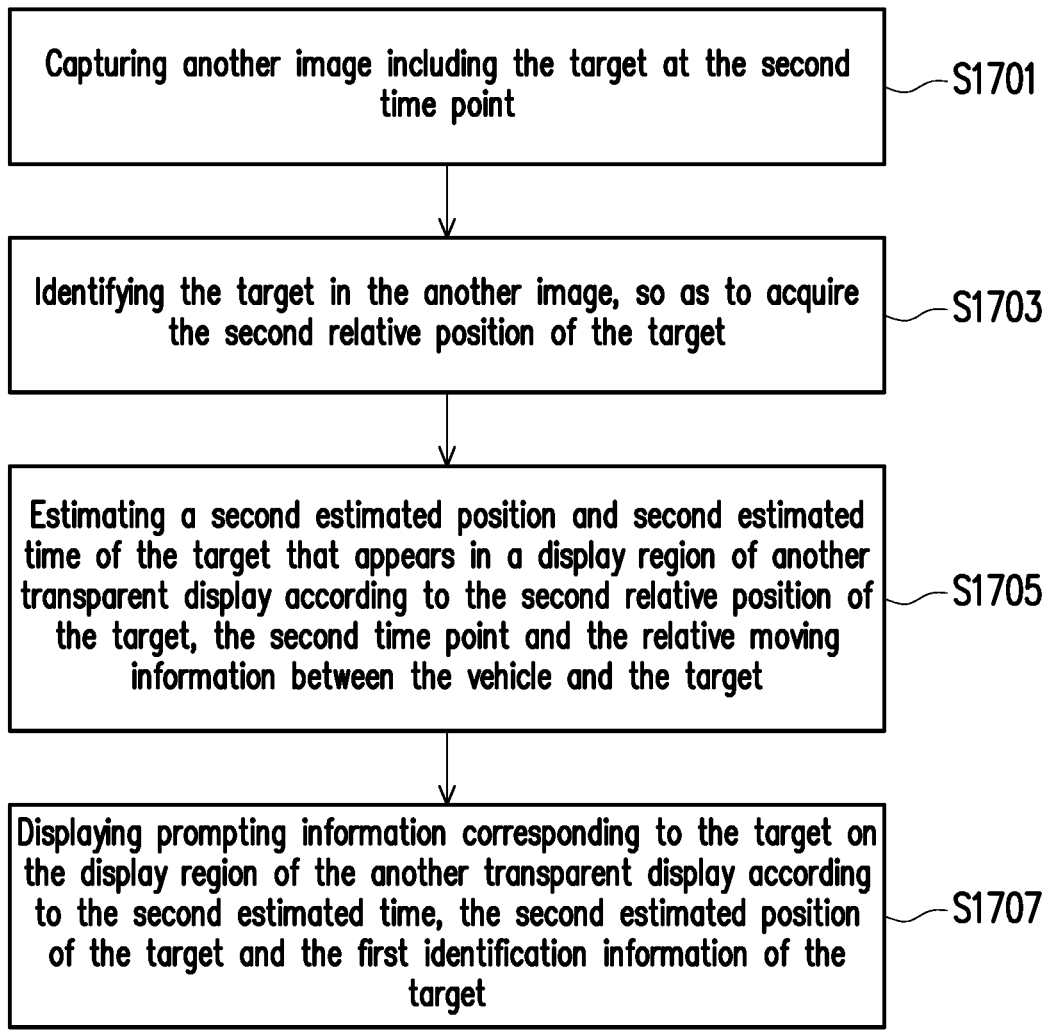
FIG. 17 is a flowchart of displaying prompting information corresponding to a target on a display region of another transparent display according to another exemplary embodiment.

FIG. 17 is a flowchart of displaying prompting information corresponding to a target on a display region of another transparent display according to another exemplary embodiment.

Referring to FIG. 15 and FIG. 17 at the same time, in Step S1701, the second external image circuit 220a captures another image including a target 30 at the second time point T1.

In Step S1703, the processor 100 identifies the target 30 in the another image, so as to acquire the second relative position L1 of the target 30.

In Step S1705, the processor 100 estimates the second estimated position L2' and the second estimated time T2' of the target 30 that appears in the display region of the another transparent display 240 according to the second relative position L1 of the target 30, the second time point T1 and the relative moving information between the vehicle 20 and the target 30.

In Step S1707, the processor 100 displays prompting information corresponding to the target 30 on the display region of the another transparent display 240 according to the second estimated time T2', the second estimated position L2' of the target and the first identification information of the target 30. That is to say, the first identification information may be acquired by comparing the image captured by the first external image circuit 120a with the relevant information, stored in the storage apparatus 160, of the target 30.

As the arraying of the multiple transparent displays may be fixed, in another exemplary embodiment, a position and time of the target that appears in another transparent display may be estimated by directly using first sensed information without sensing the position of the target again. That is to say, the second external image circuit 220a is not required to be reconfigured.

FIG. 18 is a flowchart of displaying prompting information corresponding to a target on a display region of another transparent display according to a further exemplary embodiment.

Referring to FIG. 15 and FIG. 18, in Step S1801, the processor 100 estimates the second estimated position L2' and the second estimated time T2' of the target 30 that appears in the display region of another transparent display 240 according to the first relative position L0 of the target 30, the first time point T0 and the relative moving information between the vehicle 20 and the target 30.

In Step S1803, the processor 100 displays prompting information corresponding to the target 30 on the display region of the another transparent display 240 according to the second estimated time T2', the second estimated position L2' of the target 30 and the first identification information of the target 30. The first identification information may be acquired by comparing the image captured by the first external image circuit 120a with the relevant information, stored in the storage apparatus 160, of the target 30.

For example, in one exemplary embodiment, the processor 100 acquires relative positions of targets 30 in a plurality of continuous frames of images, and respectively compares the relative position of the target 30 of the previous frame in the plurality of continuous frames of images with the relative position of the target 30 of the next frame, so as to judge a motion mode of the target 30 and forecast a path of the target 30. On the basis of this, the processor 100 may forecast the paths of the target 30 in the display regions of one or multiple transparent displays. Specifically, the processor 100 compares the position of the target 30 of the first frame of image with the position of the target 30 of the second frame of image to forecast estimated positions of the targets 30 of the third frame and the fourth frame, then compares the actual position of the target 30 of the third frame with the estimated position of the target 30 of the third frame, and compares the actual position of the target 30 of the fourth frame with the estimated position of the target 30 of the fourth frame. In the present embodiment, through the comparison of the positions of the target 30 of the first to fourth frames and even more frames, an acceleration characteristic of the target 30 may be acquired, thereby judging the motion mode of the target 30. When the acceleration of the target 30 is 0, it is judged that the motion mode of the target 30 is a constant-speed linear motion. When the acceleration of the target 30 is a constant, it is judged that the motion mode of the target 30 is a free-fall motion. When the acceleration of the target 30 is not a constant, it is judged that the motion mode of the target 30 is a uniform circular motion. The present exemplary embodiment judges the motion mode of the target 30 by comparing the positions of the targets 30 of the plurality of frames of images, so that the motion path forecasting accuracy of the target 30 is improved.

The method of displaying information and the system of displaying information of one embodiment of the present disclosure complete the identification of the target before the target enters the transparent display, so that the target-related prompting information may be displayed on the transparent display in advance.

The above embodiments describe the present disclosure, but are not intended to limit the present disclosure. Any person of ordinary skill in the art can make some variations and modifications without departing from the spirit and scope of the present disclosure, so that the protection scope of the present disclosure shall be based on that defined by an appended application patent scope and an equivalent scope thereof.

What is claimed is:

1. A method of displaying information, applied to a transparent display configured at a side of a vehicle and implemented by a processor, the method of displaying information comprising:
   identifying a user in the vehicle;
   calculating a visual range of the user according to a face position or eye positions of the user;
   capturing an image at a first time point, the image comprising a target;
   identifying the target in the image, so as to acquire a first relative position of the target;
   acquiring first identification information of the target;
   acquiring relative moving information between the vehicle and the target;
   estimating a first estimated position and first estimated time of the target that appears in a display region of the transparent display according to the visual range of the user, the first relative position of the target, the first time point and the relative moving information between the vehicle and the target before the target appears on the side of the vehicle;
   calculating a position of the target that is projected to the display region of the transparent display according to the visual range of the user, the first relative position of the target, the first time point, the first estimated position of the target, the first estimated time and the relative moving information between the vehicle and the target; and
   displaying prompting information corresponding to the target on the display region of the transparent display according to the calculated position and the first identification information of the target.

2. The method of displaying information according to claim 1, further comprising:
   estimating a plurality of relative positions of the target in the display region of the transparent display;
   displaying a plurality of pieces of prompting information corresponding to the target on the display region of the transparent display according to the relative positions;
   judging whether an actual position of the target is overlapped with the relative positions or not;
   not displaying the prompting information corresponding to the relative positions if it is judged that the actual position of the target is overlapped with the relative positions.

3. The method of displaying information according to claim 1, further comprising:
   capturing another image at a second time point, the another image comprising the target;
   identifying the target in the another image, so as to acquire a second relative position of the target;
   acquiring second identification information of the target;
   estimating a second estimated position and second estimated time of the target that appears in a display region of another transparent display according to the second relative position of the target, the second time point and the relative moving information between the vehicle and the target; and
   displaying the prompting information corresponding to the target on the display region of the another transparent display according to the second estimated time, the second estimated position of the target and the second identification information of the target.

4. The method of displaying information according to claim 1, further comprising:
   capturing another image at a second time point, the another image comprising the target;
   identifying the target in the another image, so as to acquire a second relative position of the target;
   estimating a second estimated position and second estimated time of the target that appears in a display region of another transparent display according to the second relative position of the target, the second time point and the relative moving information between the vehicle and the target; and
   displaying the prompting information corresponding to the target on the display region of the another transparent display according to the second estimated time, the second estimated position of the target and the first identification information of the target.

5. The method of displaying information according to claim 1, further comprising:
   estimating a second estimated position and second estimated time of the target that appears in a display region of another transparent display according to the first relative position of the target, the first time point and the relative moving information between the vehicle and the target; and
   displaying the prompting information corresponding to the target on the display region of the another transparent display according to the second estimated time, the second estimated position of the target and the first identification information of the target.

6. The method of displaying information according to claim 1, further comprising:
   comparing the first relative position of the target at the first time point with the relative position of the target at another time point, so as to forecast a path of the target.

7. The method of displaying information according to claim 1, further comprising:
   acquiring relative positions of the target in a plurality of continuous frames of images; and
   respectively comparing the relative position of the target of the previous frame in the plurality of continuous frames of images with the relative position of the target of the next frame, so as to judge a motion mode of the target and forecast a path of the target.

8. A system of displaying information, comprising:
a transparent display, configured at a side of a vehicle;
a first external image capturing device, configured to identify a user in the vehicle;
a speed sensing apparatus;
a processor, coupled to the transparent display, the first external image capturing device and the speed sensing apparatus, and configured to calculate a visual range of the user according to a face position or eye positions of the user,
wherein the first external image capturing device circuit is configured to capture an image at a first time point, and the image comprises a target;
the processor is configured to identify the target in the image;
the first external image capturing device is configured to acquire a first relative position of the target;
the speed sensing apparatus is configured to capture relative moving information between the vehicle and the target;
the processor is configured to estimate a first estimated position and first estimated time of the target that appears in a display region of the transparent display according to the visual range of the user, the first relative position of the target, the first time point and the relative moving information between the vehicle and the target before the target appears on the side of the vehicle;
the processor is further configured to calculate a position of the target that is projected to the display region of the transparent display according to the visual range of the user, the first relative position of the target, the first time point, the first estimated position of the target, the first estimated time and the relative moving information between the vehicle and the target; and
the processor is configured to display prompting information corresponding to the target on the display region of the transparent display according to the calculated position and the first identification information of the target.

9. The system of displaying information according to claim 8, wherein the processor is further configured to estimate a plurality of relative positions of the target in the display region of the transparent display;
the transparent display is further configured to display a plurality of pieces of prompting information corresponding to the target on the display region of the transparent display according to the relative positions;
the processor is further configured to judge whether an actual position of the target is overlapped with the relative positions or not; and
the transparent display is further configured to not display the prompting information corresponding to the relative positions if it is judged that the actual position of the target is overlapped with the relative positions.

10. The system of displaying information according to claim 8, further comprising a second external image capturing device,
wherein the second external image capturing device is configured to capture another image at a second time point, the another image comprising the target;
the processor is further configured to identify the target in the another image, so as to acquire a second relative position of the target;
the processor is further configured to acquire second identification information of the target;
the processor is further configured to estimate a second estimated position and second estimated time of the target that appears in a display region of another transparent display according to the second relative position of the target, the second time point and the relative moving information between the vehicle and the target; and
the processor is further configured to display the prompting information corresponding to the target on the display region of the another transparent display according to the second estimated time, the second estimated position of the target and the second identification information of the target.

11. The system of displaying information according to claim 8, further comprising a second external image capturing device,
wherein the second external image capturing device is configured to capture another image at a second time point, the another image comprising the target;
the processor is further configured to identify the target in the another image, so as to acquire a second relative position of the target;
the processor is further configured to estimate a second estimated position and second estimated time of the target that appears in a display region of another transparent display according to the second relative position of the target, the second time point and the relative moving information between the vehicle and the target; and
the processor is further configured to display the prompting information corresponding to the target on the display region of the another transparent display according to the second estimated time, the second estimated position of the target and the first identification information of the target.

12. The system of displaying information according to claim 8, wherein
the processor is further configured to estimate a second estimated position and second estimated time of the target that appears in a display region of another transparent display according to the first relative position of the target, the first time point and the relative moving information between the vehicle and the target; and
the processor is further configured to display the prompting information corresponding to the target on the display region of the another transparent display according to the second estimated time, the second estimated position of the target and the first identification information of the target.

13. The system of displaying information according to claim 8, wherein the processor is further configured to compare the first relative position of the target at the first time point with the relative position of the target at another time point, so as to forecast a path of the target.

14. The system of displaying information according to claim 8, wherein
the first external image capturing device is further configured to acquire relative positions of the target in continuous frames of images; and
the processor is further configured to respectively compare the relative position of the target of the previous frame in the plurality of continuous frames of images with the relative position of the target of the next frame, so as to judge a motion mode of the target and forecast a path of the target.

15. The system of displaying information according to claim 8, wherein the prompting information comprises at least one of an image of the target, a position message, a moving path and time that prompts appearing of the target; and the image of the target, the position message, the moving path and the time that prompts appearing of the target are expressed by using words or patterns.

16. The system of displaying information according to claim 8, wherein the transparent display is configured on the vehicle; the speed sensing apparatus is configured to acquire vehicle moving information of the vehicle to capture the relative moving information between the vehicle and the target according to the vehicle moving information; and the vehicle moving information comprises a relative acceleration, a relative speed and a moving direction.

* * * * *